(12) United States Patent
Okuda et al.

(10) Patent No.: US 7,775,110 B2
(45) Date of Patent: Aug. 17, 2010

(54) ULTRASONIC SENSOR

(75) Inventors: Yasuyuki Okuda, Aichi-gun (JP);
Takahiko Yoshida, Okazaki (JP);
Makiko Sugiura, Hekinan (JP);
Kazuaki Watanabe, Nagoya (JP);
Tetsuo Yoshioka, Okazaki (JP);
Hisanaga Matsuoka, Okazaki (JP)

(73) Assignees: DENSO CORPORATION, Kariya (JP);
Nippon Soken, Inc., Nishio (JP)

( * ) Notice: Subject to any disclaimer, the term of this patent is extended or adjusted under 35 U.S.C. 154(b) by 403 days.

(21) Appl. No.: 11/902,366

(22) Filed: Sep. 20, 2007

(65) Prior Publication Data
US 2008/0072675 A1 Mar. 27, 2008

(30) Foreign Application Priority Data

| Sep. 22, 2006 | (JP) | ................................ 2006-257490 |
| Mar. 5, 2007 | (JP) | ................................ 2007-053690 |
| Jun. 12, 2007 | (JP) | ................................ 2007-155029 |
| Sep. 14, 2007 | (JP) | ................................ 2007-239069 |

(51) Int. Cl.
*G01N 9/24* (2006.01)
(52) U.S. Cl. ................................ 73/627; 73/587; 73/649
(58) Field of Classification Search .................... 73/584, 73/587, 591, 596, 617, 627, 649
See application file for complete search history.

(56) References Cited
U.S. PATENT DOCUMENTS

| 3,938,614 | A | * | 2/1976 | Ahs | .......................... 181/129 |
| 4,340,944 | A | * | 7/1982 | Dory | .......................... 367/96 |
| 4,672,591 | A | | 6/1987 | Breimesser et al. | |
| 5,275,060 | A | * | 1/1994 | Lynnworth | ................ 73/861.18 |
| 5,343,109 | A | * | 8/1994 | Mockl | .......................... 310/334 |
| 5,381,386 | A | * | 1/1995 | Lum et al. | ................... 367/163 |
| 5,659,220 | A | | 8/1997 | Thurn et al. | |
| 5,664,456 | A | * | 9/1997 | Eckert | ........................ 73/290 V |

(Continued)

FOREIGN PATENT DOCUMENTS

GB 2 272 819 5/1994

(Continued)

OTHER PUBLICATIONS

Office Action mailed Nov. 13, 2009 from the German Patent Office for corresponding patent application No. 10 2007 045 494.7-35 (English translation enclosed).

*Primary Examiner*—Hezron Williams
*Assistant Examiner*—Samir M Shah
(74) *Attorney, Agent, or Firm*—Posz Law Group, PLC

(57) ABSTRACT

An ultrasonic sensor includes an ultrasonic detecting element, an acoustic matching member, and an oscillation damping member. The ultrasonic detecting element detects an ultrasonic wave. The acoustic matching member has a receiving surface that is adapted on a side of the certain object to be exposed to a space, in which the detected body exists. The receiving surface receives the ultrasonic wave reflected by the detected body. The acoustic matching member is made of a material having an acoustic impedance larger than that of air and smaller than that of the ultrasonic detecting element. The oscillation damping member is disposed between an attachment portion and the acoustic matching member. The attachment portion is adapted for attaching the ultrasonic sensor to the certain object. The oscillation damping member damps transmission of oscillation from the certain object to the acoustic matching member.

32 Claims, 13 Drawing Sheets

U.S. PATENT DOCUMENTS

| | | | |
|---|---|---|---|
| 5,709,432 A * | 1/1998 | Gryp | 297/411.32 |
| 6,107,722 A | 8/2000 | Thurn | |
| 6,672,166 B2 * | 1/2004 | Pfeifer | 73/632 |
| 6,876,127 B2 * | 4/2005 | Mitsuoka et al. | 310/324 |
| 7,246,523 B2 * | 7/2007 | Magane et al. | 73/649 |
| 7,398,687 B2 * | 7/2008 | Nakajima et al. | 73/661 |
| 7,411,335 B2 * | 8/2008 | Eckert et al. | 310/322 |
| 7,497,121 B2 * | 3/2009 | Okuda et al. | 73/632 |
| 7,513,158 B2 * | 4/2009 | Watanabe et al. | 73/584 |
| 7,612,485 B2 * | 11/2009 | Sugiura et al. | 310/324 |
| 7,614,305 B2 * | 11/2009 | Yoshioka et al. | 73/627 |
| 2003/0121331 A1 * | 7/2003 | Mitsuoka et al. | 73/632 |
| 2004/0161130 A1 * | 8/2004 | Suzuki | 381/431 |
| 2004/0163883 A1 * | 8/2004 | Suzuki | 181/173 |
| 2007/0115102 A1 * | 5/2007 | Nakano et al. | 340/435 |
| 2007/0115758 A1 * | 5/2007 | Kojima et al. | 367/197 |
| 2007/0144261 A1 * | 6/2007 | Okuda et al. | 73/627 |
| 2007/0261487 A1 * | 11/2007 | Sintes et al. | 73/290 V |
| 2008/0083282 A1 * | 4/2008 | Okuda | 73/627 |
| 2008/0307888 A1 * | 12/2008 | Yoshioka et al. | 73/627 |

FOREIGN PATENT DOCUMENTS

| | | |
|---|---|---|
| JP | U-63-81273 | 5/1988 |
| JP | U-63-200179 | 12/1988 |
| JP | U-1-156480 | 10/1989 |
| JP | A-05-281214 | 10/1993 |
| JP | A-05-304699 | 11/1993 |
| JP | A-05-347797 | 12/1993 |
| JP | A-10-224895 | 8/1998 |
| JP | A-2000-184498 | 6/2000 |
| JP | A-2002-058097 | 2/2002 |
| JP | A-2003-143685 | 5/2003 |
| JP | A-2003-333694 | 11/2003 |

* cited by examiner

ULTRASONIC SENSOR

CROSS REFERENCE TO RELATED APPLICATION

This application is based on and incorporates herein by reference JP Application No. 2006-257490 filed on Sep. 22, 2006, JP Application No. 2007-53690 filed on Mar. 5, 2007, JP Application No. 2007-155029 filed on Jun. 12, 2007, and JP Application No. 2007-239069 filed on Sep. 14, 2007.

BACKGROUND OF THE INVENTION

1. Field of the Invention

The present invention relates to an ultrasonic sensor in which an ultrasonic detecting element is attached to an acoustic matching member.

2. Description of Related Art

There is conventionally known an ultrasonic sensor in which an ultrasonic detecting element is attached to a substrate made of a metal, a resin material or the like. The ultrasonic sensor transmits an ultrasonic wave by using an element capable of transmitting the ultrasonic wave, and receives the ultrasonic wave, which collides with and is reflected from a detected body by using an element capable of receiving an ultrasonic wave, thereby performing a position measurement or a distance measurement of an object in the surroundings, or a measurement of a two-dimensional configuration or a three-dimensional configuration of the object.

Such an ultrasonic sensor may be provided with an acoustic matching layer, which adjusts acoustic impedance to improve a transmission efficiency of transmitted/received ultrasonic waves. For example, there is known an ultrasonic sensor in which an acoustic matching layer is fixed on one face of an ultrasonic detecting element composed of a piezoelectric element, the acoustic matching layer being formed to have a thickness of one fourth of the ultrasonic wave by a material, in which glass balloons are diffused in an synthetic resin (refer to JP-10-224895A).

Here, in a case of mounting the above type of ultrasonic sensor in a vehicle such as an automobile for use, an acoustic matching layer in the ultrasonic sensor is fixed by a material such as a metal. Therefore, ultrasonic waves are transmitted via the acoustic matching layer from this material to an ultrasonic detecting element thereof, and thereby this may create the cause of noises. Further, the material restrains oscillation of the acoustic matching layer caused by the ultrasonic wave to damp the oscillation, leading to reduction in detection sensitivity to the ultrasonic wave.

SUMMARY OF THE INVENTION

The present invention is made in view of the above disadvantages. Thus, it is an objective of the present invention to address at least one of the above disadvantages.

To achieve the objective of the present invention, there is provided an ultrasonic sensor attached to a certain object, the sensor having an ultrasonic detecting element, an acoustic matching member, and an oscillation damping member. The ultrasonic detecting element detects an ultrasonic wave, which is transmitted by an ultrasonic transmitting element that transmits the ultrasonic wave, and which is reflected by a detected body. The acoustic matching member has a receiving surface that is adapted on a side of the certain object to be exposed to a space, in which the detected body exists. The receiving surface receives the ultrasonic wave reflected by the detected body. The acoustic matching member transmits the ultrasonic wave received by the receiving surface to the ultrasonic detecting element, which is attached to an opposing surface of the acoustic matching member opposite the receiving surface. Here, the acoustic matching member is made of a material having an acoustic impedance larger than that of air and smaller than that of the ultrasonic detecting element. The oscillation damping member is disposed between an attachment portion and the acoustic matching member. The attachment portion is adapted for attaching the ultrasonic sensor to the certain object. The oscillation damping member damps transmission of oscillation from the certain object to the acoustic matching member.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF PREFERRED EMBODIMENTS

First Embodiment

An ultrasonic sensor in a first embodiment of the present invention will be explained with reference to the accompanying drawings. Here, there will be explained an example of a case where an ultrasonic sensor is mounted in a vehicle and is used as an obstacle sensor.

Figure 1A:
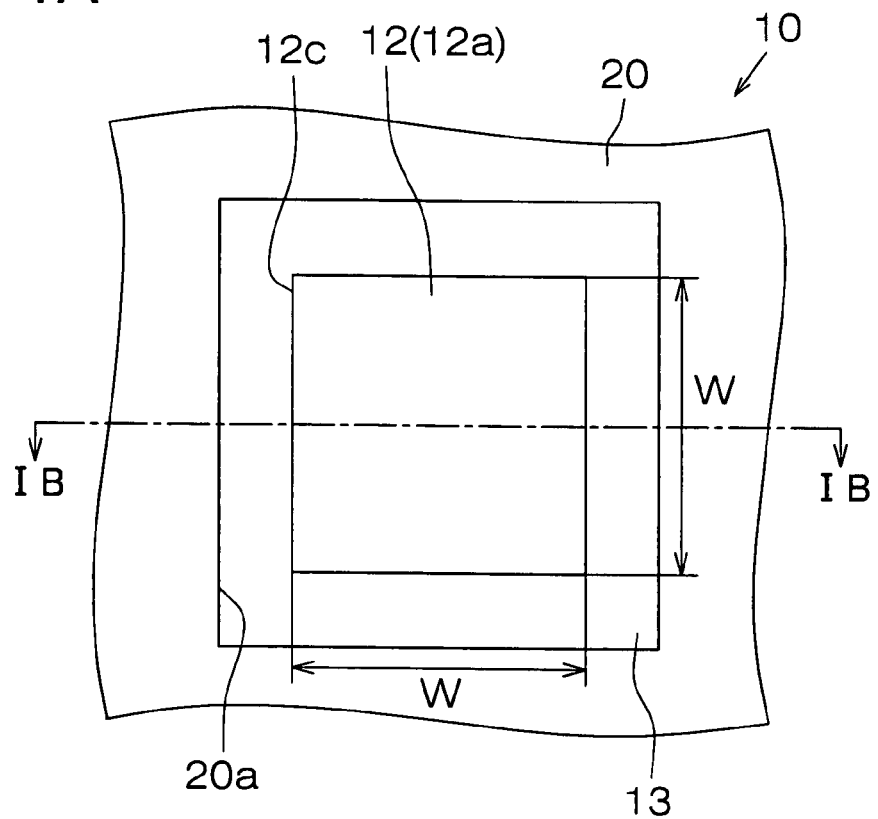
FIG. 1A is a plan explanatory diagram showing an ultrasonic sensor in a first embodiment of the present invention, viewed from a side of an acoustic matching member.
Figure 1B:
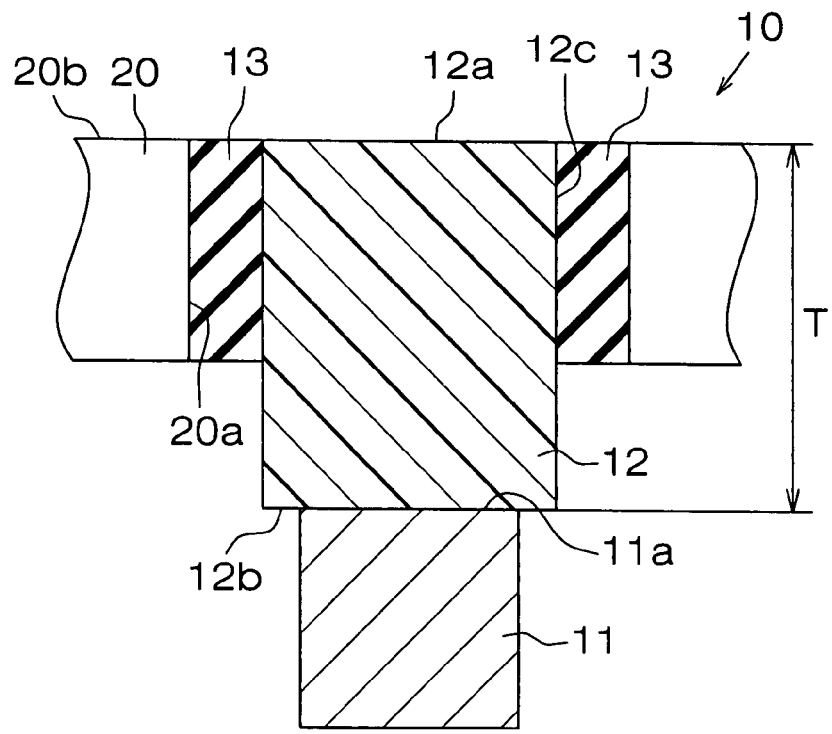
FIG. 1B is a cross section taken along line IB-IB in FIG. 1A.

Here, an upward direction in FIG. 1B indicates an exterior of a vehicle. It should be noted that a part of each figure is expanded for explanation and the other part of each figure is omitted.

As shown in FIGS. 1A and 1B, an ultrasonic sensor 10 is provided with an ultrasonic detecting element 11 and an acoustic matching member 12. The ultrasonic detecting element 11 detects an ultrasonic wave, which is transmitted to frontward of a vehicle from an ultrasonic generating element, and which is reflected by a detected body (obstacle) existing ahead of the vehicle. The acoustic matching member 12 receives the ultrasonic wave and transmitting the oscillation.

The ultrasonic sensor 10 receives on a receiving surface 12a of the acoustic matching member 12 an ultrasonic wave, which is transmitted from the ultrasonic transmitting element (not shown), and is reflected by a detected body. The ultrasonic wave received on the receiving surface 12a is transmitted via the acoustic matching member 12 to the ultrasonic detecting element 11. The ultrasonic wave transmitted to the ultrasonic detecting element 11 is detected by the ultrasonic detecting element 11 and is converted into a voltage signal.

A circuit element (not shown) electrically connected to the ultrasonic detecting element 11 is electrically connected to an ECU, which performs calculation processing based upon a voltage signal outputted from the ultrasonic detecting element 11. For example, a time difference or a phase difference between the transmitted ultrasonic wave and the received ultrasonic wave is determined, thereby making it possible to perform a distance measurement or the like to the obstacle.

The ultrasonic detecting element 11 is attached to the center of an attachment surface 12b (opposing surface) opposing the receiving surface 12a of the acoustic matching member 12 for receiving an ultrasonic wave, by an adhesive or the like. The acoustic matching member 12 is attached to a predetermined position of a vehicle 60, for example, a bumper 20 (refer to FIG. 3) in the present embodiment.

The bumper 20 has an attachment portion 20a, which is adapted to penetrate through the bumper 20 in a size to be capable of receiving the acoustic matching member 12. The acoustic matching member 12 has a side portion 12c, which is in the vicinity of the receiving surface 12a, for attachment to the attachment portion 20a via an oscillation damping member 13 in a state the receiving surface 12a is exposed to an outside of the bumper 20.

Here, the receiving surface 12a of the acoustic matching member 12 is flush with the oscillation damping member 13 and an outer surface 20b of the bumper 20 and has a smooth flat surface formed thereon.

The ultrasonic detecting element 11 is formed in a square, columnar shape having a thickness of 3 mm and a square shaped section of 2 mm×2 mm. Also, the ultrasonic detecting element 11 includes electrodes and a piezoelectric element formed of lead zirconate titanate (PZT), which is provided between the electrodes. Because the PZT has a large piezoelectric constant, it can receive an ultrasonic wave having a small sound pressure to provide high detection sensitivity to the ultrasonic wave. Therefore, it can be suitable for an ultrasonic detecting element. Here, when the ultrasonic detecting element 11 is formed thicker, a strain thereof becomes larger upon receiving an ultrasonic oscillation. Therefore, the detection sensitivity can be made high.

The acoustic matching member 12 is formed of a material having sound impedance which is larger than that of air and smaller than that of the ultrasonic detecting member 11. Also, the acoustic matching member 12 has a square, columnar shape and has a transverse cross section shape of a substantial quadrate.

In consequence, as compared to a case of no attachment of the acoustic matching member 12, a difference in acoustic impedance in the boundary with the air can be made smaller. Accordingly, reflection of an ultrasonic wave in the boundary with the air can be restricted to increase an incident ultrasonic wave.

In addition, since the ultrasonic detecting member 11 is attached in a position of being invisible from an outside of the bumper 20, the acoustic matching member 12 also serves as a protection member for protecting the ultrasonic detecting member 11 from foreign matter or water (moisture).

In the present embodiment, the acoustic detecting member 12 is formed of a resin material such as polycarbonate based resin having an excellent durability. Because the polycarbonate based resin has a degree of elasticity a temperature change of which is small, a change of a wavelength of the ultrasonic wave accompanying the temperature change can be made small, making it possible to stably (reliably) generate a standing wave as described later.

The acoustic matching member 12 is formed so as to have a width W equal to or less than a half of the wavelength of the ultrasonic wave in air and have a thickness T of generally one fourth of the wavelength of the ultrasonic wave inside the ultrasonic detecting member 12. For example, in a case where a frequency of the ultrasonic wave is 65 kHz, the width W is approximately 2.6 mm and the thickness T is approximately 5 mm.

The receiving surface 12a of the acoustic matching member 12 has an area larger than that of the attachment surface 11a of the ultrasonic detecting member 11. When the ultrasonic matching member 12 is formed in this way, since the energy of the ultrasonic wave received on the receiving surface 12a is transmitted by the area smaller than that of the receiving surface 12a, the energy per unit area increases, thereby enabling an increase in transmission efficiency of the energy.

Here, it is preferable that an area of the attachment surface 12a is approximately 1.2 times of an area of the attachment surface 11a of the ultrasonic detecting member 11.

The acoustic matching member 12 is formed to have the thickness T which is one fourth of the wavelength of the ultrasonic wave and thereby, a standing wave can be generated inside the acoustic matching member 12. This helps in reducing cancellation of the ultrasonic wave incident inside the acoustic matching member 12 and the ultrasonic wave reflected on the boundary between the acoustic matching member 12 and the ultrasonic detecting member 11, the cancellation being caused by interference with each other. In consequence, the ultrasonic wave can be efficiently transmitted to the ultrasonic detecting element 11.

It should be noted that a resin material is exemplified as the acoustic matching member 12, but on condition of satisfying a relation of acoustic impedance and a relation between wavelength and dimension, for example, a metallic material (e.g., aluminum), ceramics or glass may be used. Each of these materials has an environment resistance such as an atmospheric corrosion resistance in the same way with the resin material, and can be suitable in use for the acoustic matching member 12.

The acoustic matching member 12 may have a different configuration from the above square column shape, but a circular, columnar shape. In addition, by forming the acoustic matching member 12 to have a width of less than a half (½) of the wavelength of the ultrasonic wave, in a case of arranging a plurality of ultrasonic sensors 10 in an array as shown in a second embodiment to be described later, a distance between the central portions of the acoustic matching members 12 can be made to be equal to one half (½) of the wavelength of the ultrasonic wave transmitting in the air. This arrangement brings about high detection accuracy. In a case of not arranging the plurality of the ultrasonic sensors in the array, the width of the acoustic matching member 12 may not be equal to or less than the half of the wavelength of the ultrasonic wave in the air. Also, in this case also, the acoustic matching member 12 can function effectively.

An oscillation damping member 13 is interposed between the side portion 12c of the acoustic matching member 12 and the attachment portion 20a of the bumper 20 for fixing the side portion 12c of the acoustic matching member 12 to the attachment portion 20a and preventing transmission of oscillation from the attachment portion 20a of the bumper 20.

The oscillation damping member 13 secures the acoustic matching member 12 to the attachment portion 20a so that no step is formed between the receiving surface 12a of the acoustic matching member 12 and the outer surface of the bumper 20. The oscillation damping member 13 is adhered and fixed to the side portion 12c of the acoustic matching member 12 and the attachment portion 20a by an adhesive or the like. In consequence, the acoustic matching member 12 and the oscillation damping member 13 can be strongly fixed with each other in such a manner that a fixed portion therebetween is not broken by collision of foreign matter.

Here, it is preferable that an adhesive for bonding the oscillation damping member 13 has an environment resistance such as water resistance, oil resistance, chemical resistance and atmospheric corrosion resistance and is formed of a material having degree of elasticity close to that of the oscillation damping member 13. Further, for enhancing an adhesive strength, primer processing or surface treatment by ultraviolet line (UV) and coating can be made on an adhesive surface of the oscillation damping member 13 or on an adhesive surface of the acoustic matching member 12.

As viewed from an outside of the bumper 20, the oscillation damping member 13 is interposed in the entire clearance between the side portion 12c and the attachment portion 20a, which prevents foreign matter, water (moisture) and the like from entering into an inside of the bumper 20 through the clearance between the side portion 12c and the attachment portion 20a.

The oscillation damping member 13 is formed of a material (e.g., silicone rubber) having impedance smaller than that of the acoustic matching member 12 and a damping constant higher than that thereof. Further, a material having a small degree of elasticity and a small density is suitable in use for the acoustic matching member 12. For example, a rubber based material, a resin containing air holes, such as expandable resin, or a sponge may be used.

The oscillation damping member 13 formed of such a material is interposed (provided) between the bumper 20 and the acoustic matching member 12, so that the ultrasonic wave is limited from being transmitted via the attachment portion 20a from the bumper 20 to the side portion 12c of the acoustic matching member 12, and thereby the ultrasonic wave is limited from causing the noises.

It is preferable that the oscillation damping member 13 is constructed so that a force for restraining oscillation of the acoustic matching member 12 is made small.

Figure 2:
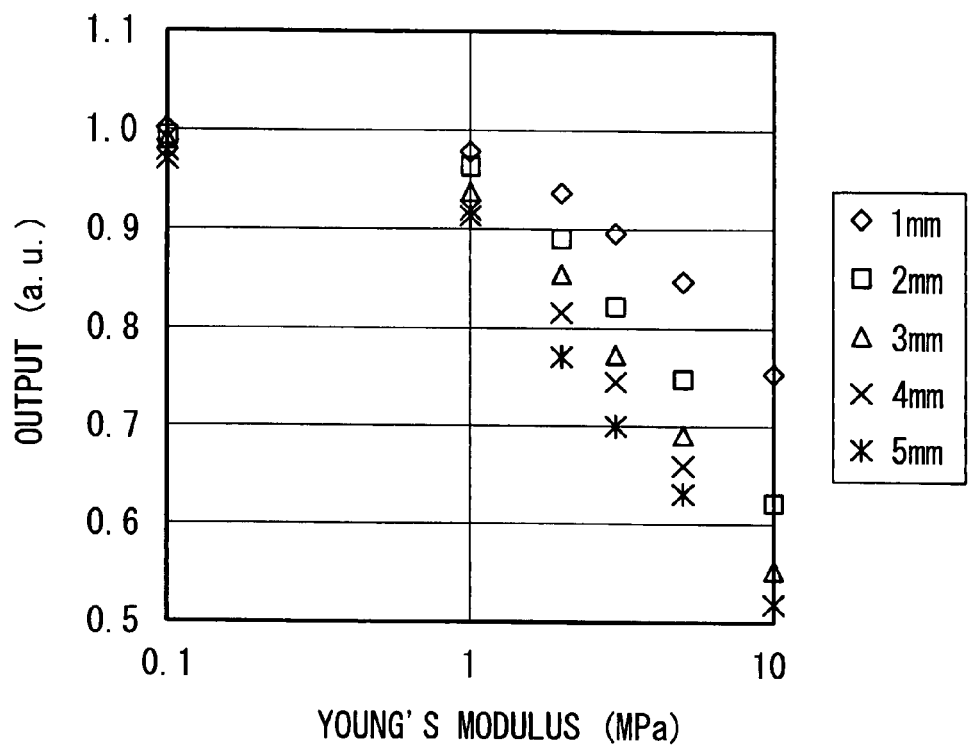
FIG. 2 is an explanatory diagram showing an influence of degree of elasticity and thickness of an oscillation damping member on detection sensitivity of the ultrasonic sensor.

FIG. 2 shows the result of having simulated an influence of the degree of elasticity and the thickness of the acoustic damping member 13 on oscillation transmission of the acoustic matching member 12.

As for calculation conditions, the width W of the acoustic matching member 12 (i.e., a distance between opposing side edges of the receiving surface 12a) is set to 2 mm, the thickness T is set to 6 mm, and the width of the oscillation damping member 13 is set to 2 mm. Here, the width of the oscillation damping member 13 indicates a length between the side portion 12c of the acoustic matching member 12 and the attachment portion 20a of the bumper 20, and the thickness thereof means a length (contact length), over which the oscillation damping member 13 is in contact with the side portion 12c of the acoustic matching member 12, in the direction from the receiving surface 12a to the ultrasonic detecting element 11.

The output by the ultrasonic sensor 10 is calculated based on six levels (0.1, 1, 2, 3, 5 and 10 MPa) of the degree of elasticity (Young's modulus) of the oscillation damping member 13 and based on five levels (1, 2, 3, 4 and 5 mm) of the thickness thereof.

The output in the longitudinal axis is a normalized signal strength outputted from the ultrasonic sensor 10, the normalized signal strength being normalized by a restraint-free signal strength outputted by the ultrasonic sensor 10 in a case, where restraint by the oscillation damping member 13 is not applied. As the value of the output is closer to "1", the restraint by the oscillation damping member 13 is smaller, and thereby reduction in detection sensitivity to the ultrasonic wave is smaller.

As shown in FIG. 2, it is found out that there is a tendency that as the degree of elasticity of the oscillation damping member 13 becomes larger, the output is lowered. In addition, it is found out that there is a tendency that as the thickness of the oscillation damping member 13 becomes larger, the output is lowered. This is because as the degree of elasticity of the oscillation damping member 13 and the thickness thereof become larger, the restraint by the oscillation damping member 13 is larger.

That is, by reducing the degree of elasticity and the thickness of the oscillation damping member 13, the force for restraining oscillation of the acoustic matching member 12 can be made small. Therefore, the damping of the ultrasonic oscillation can be made small to improve detection sensitivity.

For example, by making the degree of elasticity of the oscillation damping member 13 equal to or less than 3 MPa as 3/1000 of degree of elasticity of the acoustic matching member 12, reduction of the output can be controlled to be equal to or less than 30%. That is, reduction of the detection sensitivity can be made equal to or less than 30%. Further, by making the thickness of the oscillation damping member 13 equal to or less than 2 mm as ⅓ (one third) of the thickness T of the acoustic matching member 12, reduction of the output can be controlled to be equal to or less than 20%. That is, reduction of the detection sensitivity can be made equal to or less than 20%.

Furthermore, for example, by making the degree of elasticity of the oscillation damping member 13 equal to or less than 1 MPa as 1/1000 of degree of elasticity of the acoustic matching member 12, reduction of the output can be controlled to be equal to or less than 10%. That is, reduction of the detection sensitivity can be made equal to or less than 10%. Further, by making the thickness of the oscillation damping member 13 equal to or less than 2 mm as ⅓ (one third) of the thickness T of the acoustic matching member 12, reduction of the output can be controlled to be equal to or less than 5%. That is, reduction of the detection sensitivity can be made equal to or less than 5%. It should be noted that the dimension of the acoustic matching member 12 or the like does not affect the detection sensitivity largely.

The existence of the ultrasonic sensor 10 can be designed so as not to stand out by adjusting a color tone of the acoustic matching member 12 and the oscillation damping member 13 with that of the bumper 20 through selecting or coating of the material of the acoustic matching member 12 and the oscillation damping member 13.

Accordingly, the ultrasonic sensor 10 excellent in design can be manufactured and a fine appearance of the bumper 20 can be maintained.

(Modification)

The acoustic matching member 12 may be structured so that the acoustic impedance increases from the receiving surface 12a to the attachment surface 12b.

Figure 3A:
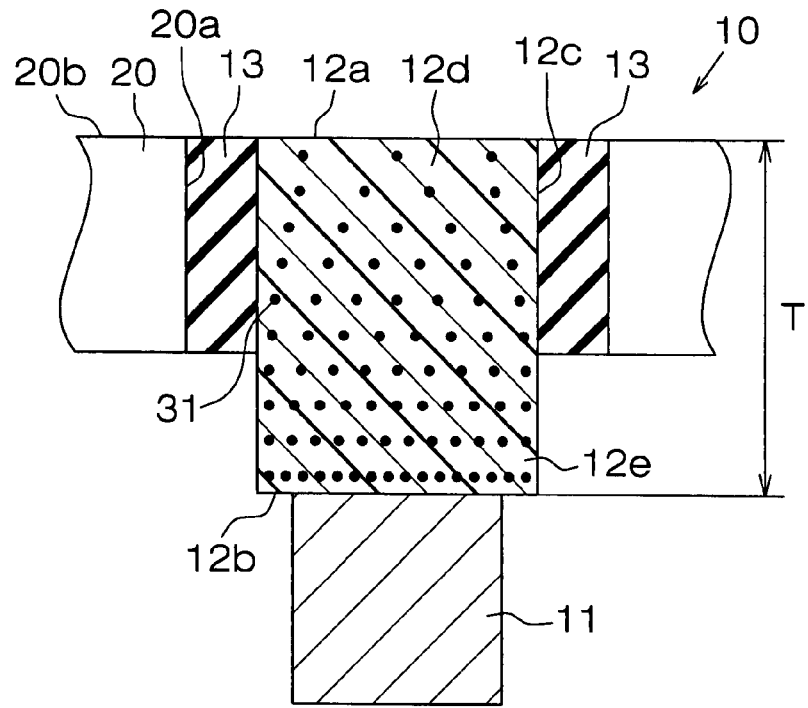
FIG. 3 is an explanatory view showing a modification of the acoustic matching member in the first embodiment.

As shown in FIG. 3A, the acoustic impedance can be changed by adding glass fillers 31 to a polycarbonate based material as reference. As an additional amount of the glass fillers 31 to the polycarbonate based material increases, the acoustic impedance can be increased.

For example, when an part 12d of the acoustic matching member 12 toward the side of the receiving surface 12a is formed of a monolithic polycarbonate based material and an part 12e of the acoustic matching member toward the side of the attachment surface 12b is formed of a material with 30% of additional glass fillers, the degree of the elasticity in the part 12d toward the side of the receiving surface 12a is approximately 2 GPa and the part 12e toward the side of the attachment surface 12b is approximately 5 GPa.

This causes a difference in acoustic impedance of each boundary between air and the acoustic matching member 12 and between the acoustic matching member 12 and the ultrasonic detecting element 11 to be reduced. Therefore, reflection or dissipation of the ultrasonic wave from the boundary can be reduced and the damping of the ultrasonic wave can be reduced.

Alumina or silica may be used as the additional filler. In addition, as long as the acoustic impedance increases from the receiving surface 12a toward the attachment surface 12b, an additional amount of the fillers can be arbitrarily made.

The acoustic matching member 12 may be formed by laminating materials having different acoustic impedance in an ascending order of the impedance (i.e., from small to large impedance) from the side of the receiving surface 12a.

Figure 3B:
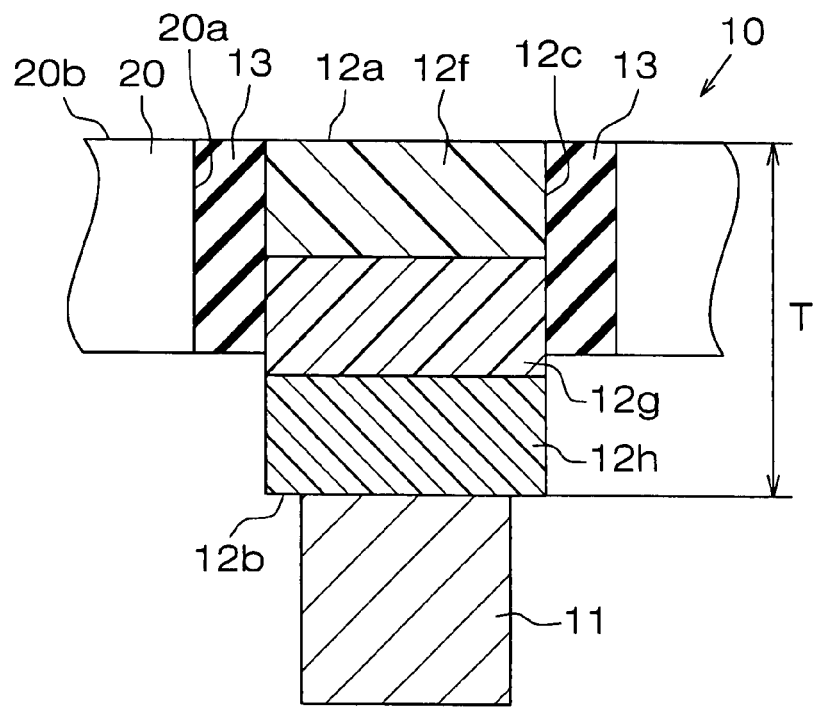

For example, as shown in FIG. 3B, there is exemplified the acoustic matching member 12 formed by laminating a polypropylene 12f, a polycarbonate 12g with 40% of additional glass fillers and a phenolic resin 12h with 40% of additional glass fillers in this order in the direction from the receiving surface 12a toward the attachment surface 12b.

This causes a difference in acoustic impedance of each boundary between air and the acoustic matching member 12 and between the acoustic matching member 12 and the ultrasonic detecting element 11 to be reduced. Therefore, reflection or dissipation of the ultrasonic wave from the boundary can be reduced and the damping of the ultrasonic wave can be reduced. Further, since the polycarbonate 12g with 40% of additional glass fillers and the phenolic resin 12h with 40% of additional glass fillers each have a small temperature change of Young's modulus, a temperature change of the wavelength can be made small.

Figure 4:
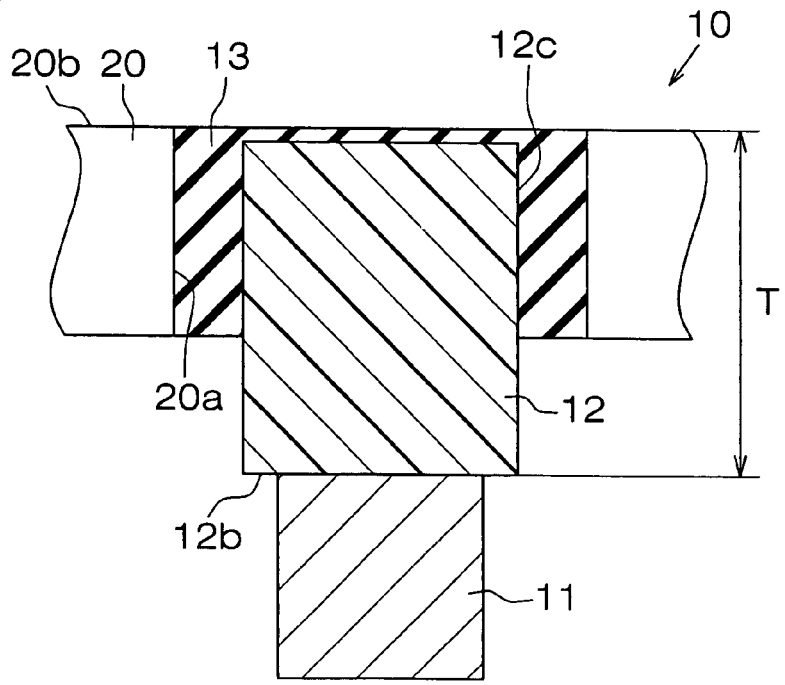
FIG. 4 is an explanatory view showing another modification of the oscillation damping member.

As shown in FIG. 4, the oscillation damping member 13 may be structured to cover the receiving surface 12a of the acoustic matching member 12 with a thin part (for example, equal to or less than 1 mm in thickness) of the member 13.

Because, in use of this structure, the boundary between the acoustic matching member 12 and the oscillation damping member 13 is not exposed to an outside, intrusion of water (moisture) or the like can be limited.

Figure 5A:
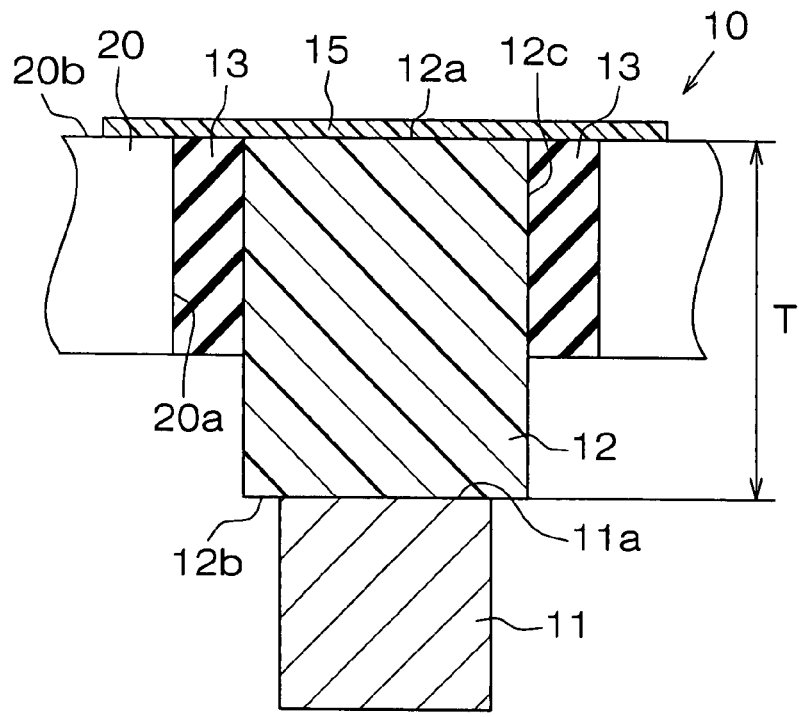
FIGS. 5A, 5B are explanatory views each showing an ultrasonic sensor equipped with a coating layer for coating the oscillation damping member and a receiving surface of the acoustic matching member.
Figure 5B:
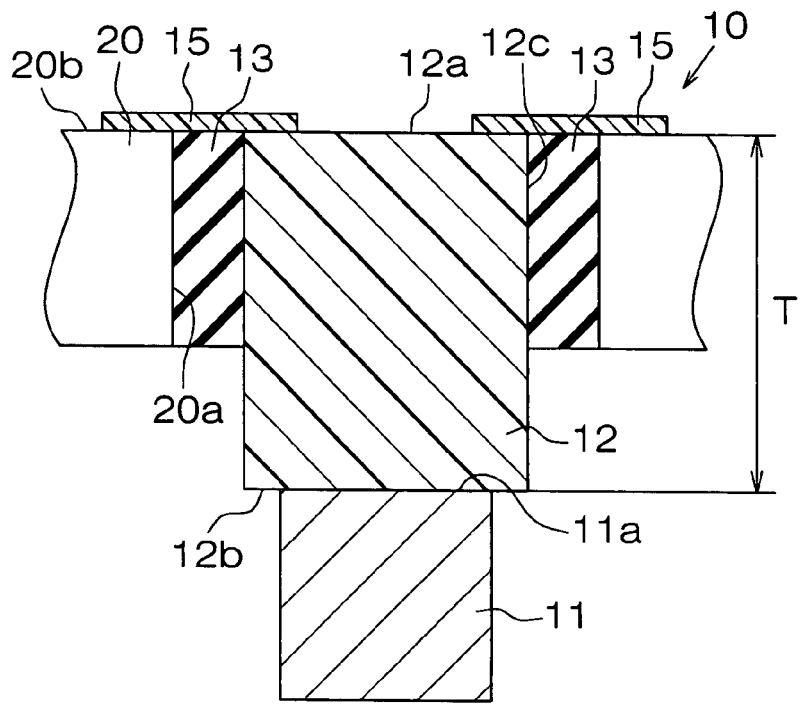

As shown in FIGS. 5A and 5B, a coating layer 15 may be provided so as to cover at least a part of the receiving surface 12a of the acoustic matching member 12 and the oscillation damping member 13. FIG. 5A shows a structure of coating the entire surface of the receiving surface 12a, with the coating layer 15 and FIG. 5B shows a structure of coating at least part of the receiving surface 12a. In the structure of coating a part of the receiving surface 12a, a ratio of a coated area of the receiving surface 12a coated (covered) with the coating layer 15 to an entire area of the receiving surface 12a is defined as "coating rate". For example, in the structure of coating the entire surface of the receiving surface 12a with the coating layer 15, the coating rate (i.e., coverage) is "1".

Because the oscillation damping member 13, the boundary between the acoustic matching member 12 and the oscillation damping member 13 and the acoustic matching member 12 are coated by providing the coating layer 15, it is prevented that water (moisture) or the like enter into an inside of the ultrasonic sensor 10. In addition, by adjusting the color tone of the coating layer 15 with the color tone of the bumper 20, it can be hard to visualize the existence of the ultrasonic sensor 10 from an outside, thereby improving design.

It is preferable that the coating layer 15 is structured in such a manner as to make the force of restraining the oscillation of the acoustic matching member 12 be small. In this way, the decay of the ultrasonic oscillation can be made small. Therefore, the decay of the oscillation is made small to improve detection sensitivity.

Figure 6:
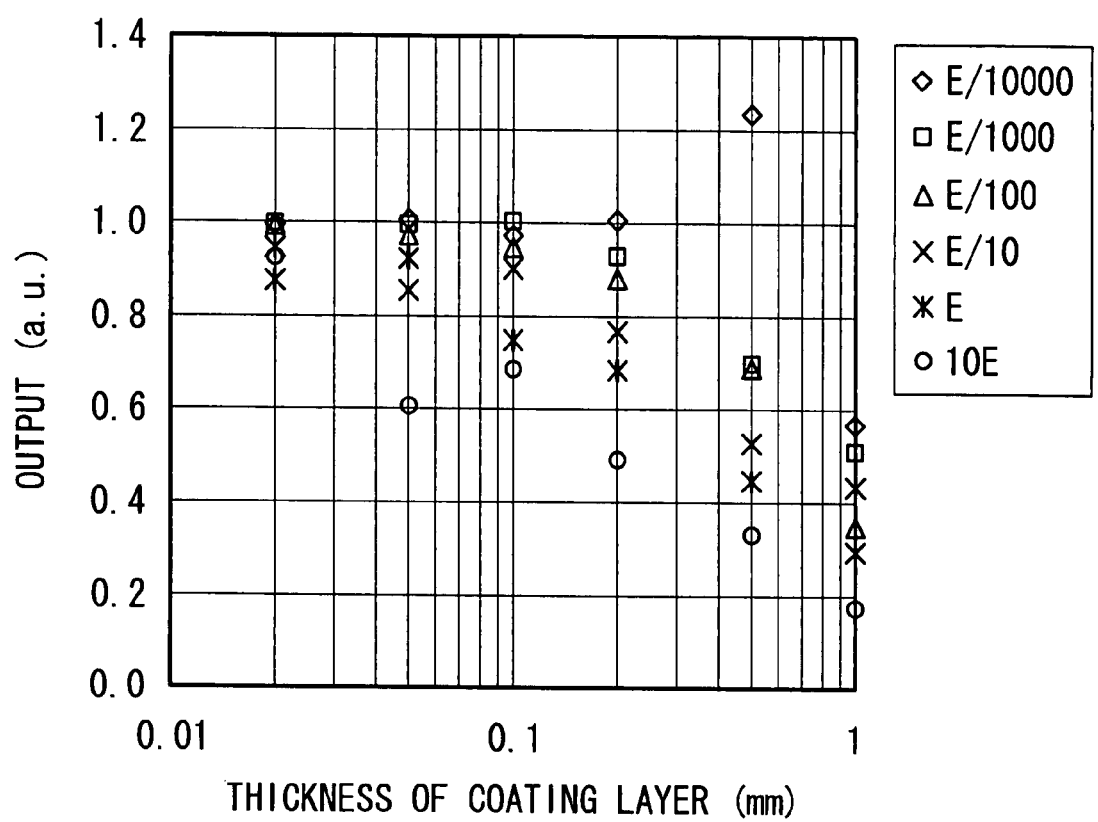
FIG. 6 is an explanatory diagram showing an influence of degree of elasticity and thickness of the coating layer on detection sensitivity of the ultrasonic sensor.

FIG. 6 is the result of having simulated an influence of degree of elasticity and thickness of the coating layer 15 on oscillation transmission of the acoustic matching member 12 in a case of providing the coating layer 15 over the entire surface of the receiving surface 12a. As for calculation conditions, the width W of the acoustic matching member 12 is set to 2 mm, the thickness T is set to 6 mm, the width of the oscillation damping member 13 is set to 2 mm and the thickness thereof is set to 1 mm.

E in FIG. 6 denotes degree of elasticity (1 GPa) of the acoustic matching member 12. The simulation is performed (calculated) based on five levels (E/10000, E1000, E/100, E/10, E and 10E, each of which corresponds to 0.1 MPa to 10 GPa) of the degree of elasticity of the coating layer 15 and based on six levels (0.02, 0.05, 0.1, 0.2, 0.5, and 1 mm) of the thickness thereof.

As shown in FIG. 6, it is found out that there is a tendency that as the degree of elasticity of the coating layer 15 becomes larger, the output is lowered. In addition, except that the degree of elasticity of the coating layer 15 is E/10000 (0.1 MPa) and the thickness thereof is 0.5 mm, it is found out that there is a tendency that as the thickness of the coating layer 15 becomes larger, the output is lowered. This is because as the degree of elasticity of the coating layer 15 and the thickness thereof become larger, the restraint by the coating layer 15 is larger.

That is, by reducing the degree of elasticity and the thickness of the coating layer 15, the force for restraining oscillation of the acoustic matching member 12 can be made small. Therefore, the damping of the ultrasonic oscillation can be made small to improve detection sensitivity.

It is preferable that the coating layer 15 is formed of a material having a degree of elasticity smaller than that of the acoustic matching member 12 in view of compatibility (i.e., matching) in the acoustic impedance between the coating layer 15 and the acoustic matching member 12.

For example, assuming that the degree of elasticity of the coating layer 15 is set equal to or less than E/10 (100 MPa) and the thickness thereof is set equal to or less than 0.1 mm, the reduction of the output can be made equal to or less than 20%. That is, the reduction of the detection sensitivity can be made equal to or less than 20%.

In a case where the degree of elasticity of the coating layer 15 is E/10000 (0.1 MPa) and the thickness thereof is 0.5 mm, since the resonance frequency of the acoustic matching member 12 is substantially equal to the resonance frequency of the coating layer 15, the oscillation is amplified to increase the output. That is, the detection accuracy can be improved by making the resonance frequency of the coating layer 15 equal to that of the acoustic matching member 12.

Figure 7:
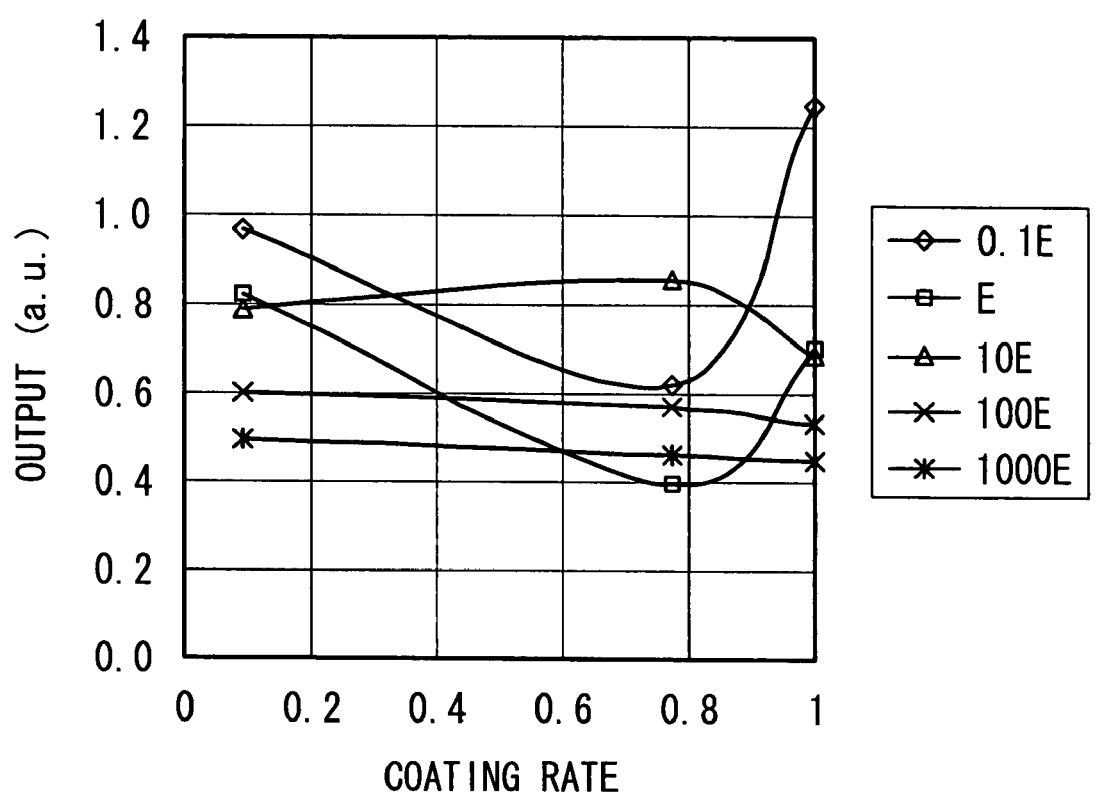
FIG. 7 is an explanatory diagram showing an influence of coating rate in which the coating layer covers the receiving surface of the acoustic matching member on detection sensitivity of the ultrasonic sensor.

FIG. 7 is the result of having simulated an influence of a coating rate of the coating layer 15 on oscillation transmission of the acoustic matching member 12. The calculation conditions are similar to those in FIG. 6, and the thickness of the coating layer 15 is set to 0.5 mm.

E in FIG. 7 denotes degree of elasticity (1 MPa) of the oscillation damping member 13. The simulation is performed based on five levels (0.1E, E, 10E, 100E and 1000E10 corresponding to 0.1 MPa to 1 GPa) of the degree of elasticity of the coating layer 15 and based on three levels (0.1, 0.75, and 1 mm) of the coating rate thereof.

As shown in FIG. 7, in a case where the degree of elasticity of the coating layer 15 is larger than that of the oscillation damping member 13 (10E, 100E and 1000E10 (corresponding to 10 MPa to 1 GPa), the output is substantially constant regardless of the coating rate. On the other hand, in a case where the degree of elasticity of the coating layer 15 is less than that of the oscillation damping member 13 (0.1E, E corresponding to 0.1, 1 MPa), there exists a region where the output is reduced caused by that the coating rate is reduced from 1.

Accordingly, in a case where the degree of elasticity of the coating layer 15 is larger than that of the oscillation damping member 13, the coating rate can be arbitrarily made, but in a case where the degree of elasticity of the coating layer 15 is less than that of the oscillation damping member 13, it is preferable that the coating rate is 1, that is, the coating layer 15 coats the entire surface of the receiving surface 12a.

A material of the coating layer 15 can be arbitrarily selected when the above conditions are met. For example, a resin based material, such as silicone, polyurethane, polyester, vinyl chloride and polyester based thermoplastic elastomer may be used, and also a metal film may be used. Further, a colored film a color tone of which is adjusted to that of the bumper 20, may be used.

An example of the ultrasonic detecting element 11 may include an element in which an oscillation portion formed of a piezoelectric film is formed on a thin film formed as a thin portion of the substrate by using MEMS (Micro Electric Mechanical System) technique. An example of such an element may include a piezoelectric MEMS element or a capacitive MEMS element. Further, an example of the piezoelectric MEMS element may include a membrane type or a cantilever type element.

In addition, an example of the ultrasonic detecting element 11 may include an ultrasonic detecting element which can not only receive but also send signals.

The oscillation damping member 13 may be formed to have a square cross section with a size of an inner periphery slightly smaller than the side portion 12c of the acoustic matching member 12 and a size of an outer periphery slightly larger than the attachment portion 20a. In consequence, the side portion 12c of the acoustic matching member 12 is fitted into the inner periphery of the oscillation damping member 13 and the outer periphery thereof is fitted into the attachment portion 20a and thereby, the acoustic matching member 12 can be attached to the attachment portion 20a through the oscillation damping member 13. According to this structure, the adhesion (bonding) process is not necessary.

In addition, after the liquid resin material is applied to the side portion 12c of the acoustic matching member 12, or is provided to a clearance between the side portion 12c and the attachment portion 20a, the liquid resin material may be solidified to form the oscillation damping member 13. According to this structure, adhesiveness between the acoustic matching member 12 and the oscillation damping member 13 can be improved.

Figure 8:
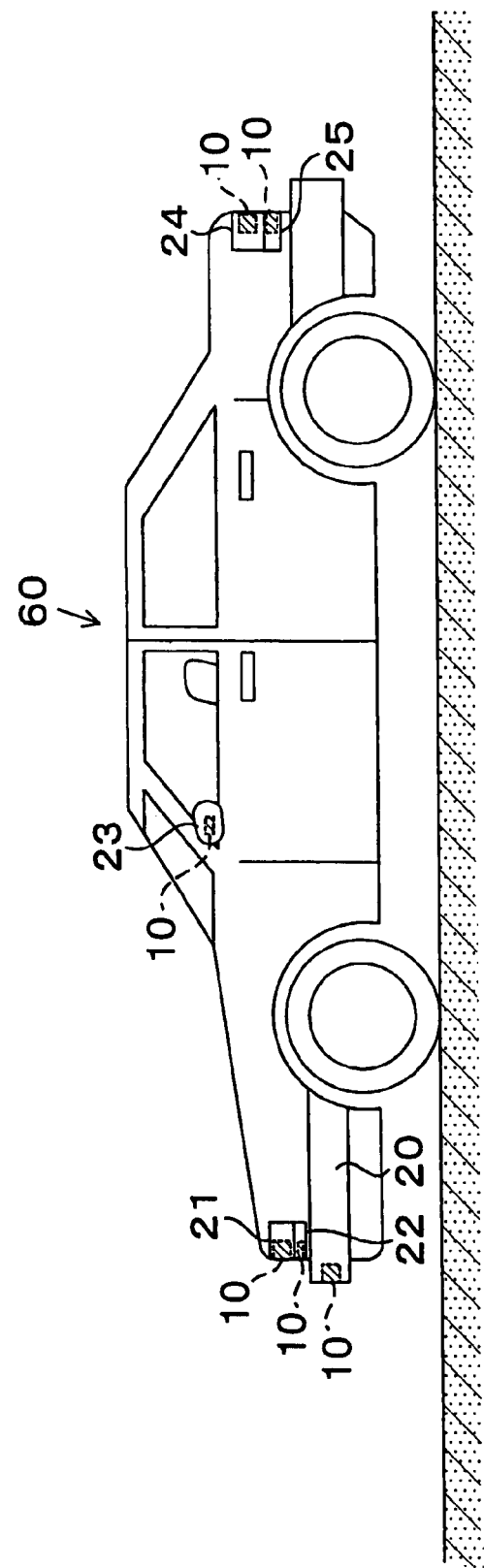
FIG. 8 is an explanatory view showing a mounting position of the ultrasonic sensor to a vehicle.

The ultrasonic sensor 10 may be attached to a member other than the bumper 20 in a vehicle for use. For example, as shown in FIG. 8, the ultrasonic sensor 10 may be attached to a head lamp cover 21. When this structure is used, since the ultrasonic wave reflected on an obstacle or the like is not blocked by a part of a vehicle, the obstacle can be securely detected by the ultrasonic sensor 10. Accordingly, this structure is effective in a case where the ultrasonic sensor 10 is applied to an obstacle sensor or the like.

Further, the ultrasonic sensor 10 may be attached to other members in accordance with an application thereof. For example, in a case of using the ultrasonic sensor 10 as an obstacle sensor in the side of a vehicle, it may be attached to a cover 22 of a turn signal, a door mirror 23 or the like. In a case of using the ultrasonic sensor 10 as an obstacle sensor in the rear side of a vehicle, it may be attached to a cover 24 of a rear lamp, a cover 25 of a back lamp or the like.

Here, in a case of applying the ultrasonic sensor 10 to the head lamp cover 21 or the like, there can be used the acoustic matching member 12 in which at least the receiving surface 12a is coated (covered) with metallic evaporation (metallic disposition). This causes an improvement of atmospheric corrosion resistance and water resistance of the acoustic matching member 12.

Figure 9A:
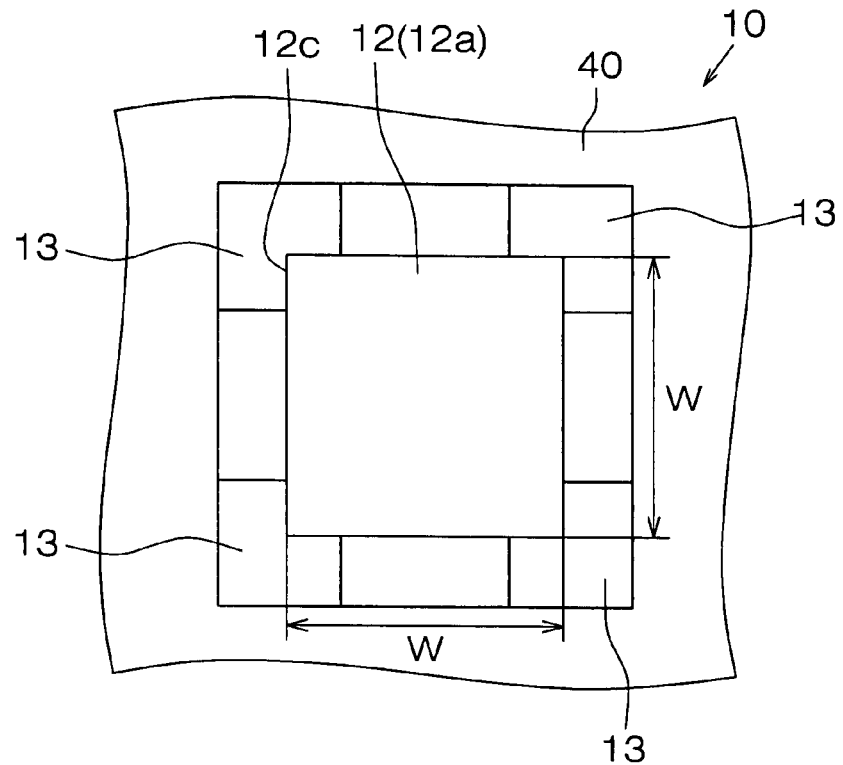
FIGS. 9A, 9B are explanatory views showing modifications of the oscillation damping member.
Figure 9B:
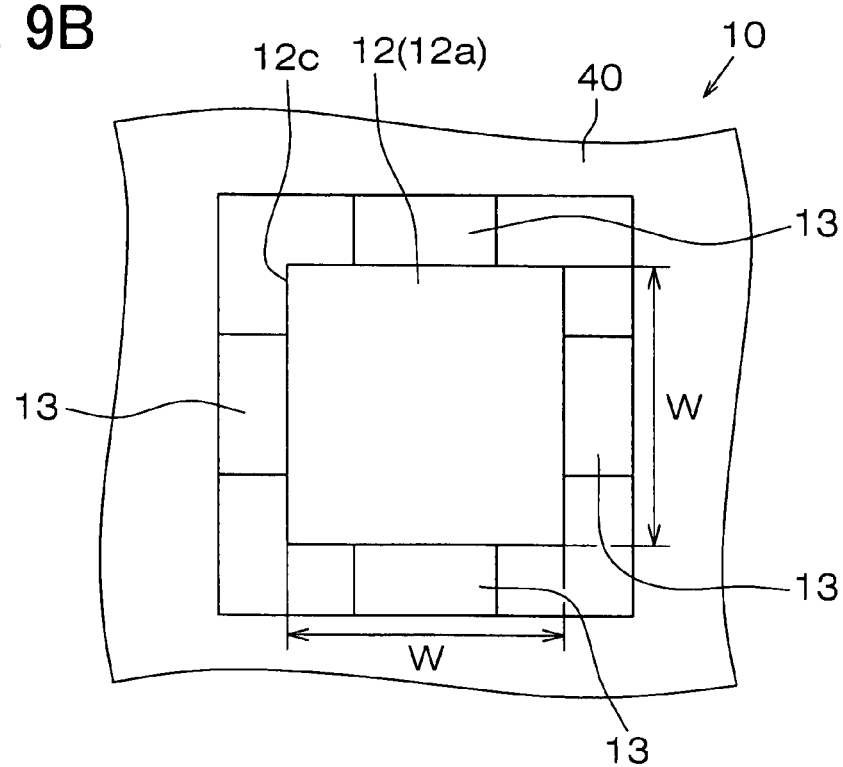

In a case where there is a little possibility that foreign matter or water (moisture) enters into the ultrasonic sensor 10, for example, in a case of attaching the ultrasonic sensor 10 to a constitution component of a robot used in a room, there can be, as shown in FIGS. 9A and 9B, adopted a structure that the oscillation damping member 13 is provided only in a part of the side portion 12c.

For example, as shown in FIG. 9A, four corners of the acoustic matching member 12 may be retained by the oscillation damping member 13 or as shown in FIG. 9B, the oscillation damping member 13 may be retained by a central portion of each section of the side portion 12c.

When this structure is used, since an area of transmitting the oscillation can be reduced, an influence of noises transmitted from the constitution member 40 can be made small.

Advantages of First Embodiment (1) Because the ultrasonic sensor 10 is provided with the oscillation damping member 13 interposed between the attachment portion 20a and the acoustic matching member 12 to damp transmission of oscillation from a vehicle 60 (the bumper 20) to the acoustic matching member 12, the ultrasonic wave is limited from being transmitted from the vehicle 60 (bumper 20) to the acoustic matching member 12, and thereby the ultrasonic wave is limited from causing noises. By this, since noises of the ultrasonic wave can be reduced, the detection sensitivity of the ultrasonic wave can be improved, making it possible to realize the ultrasonic sensor 10 with a high detection sensitivity to the ultrasonic wave.

Even in a case where the ultrasonic sensor 10 is attached to a material approximate in acoustic properties to the acoustic matching member 12 as in the case of the resin material constituting the vehicle 60, it is possible to realize the ultrasonic sensor 10 with a high detection sensitivity of the ultrasonic wave. Therefore, the ultrasonic sensor 10 can be applied to an obstacle sensor for detecting an obstacle or humans in the neighborhood of the vehicle 60.

The attachment portion 20a of the ultrasonic sensor 10 may be attached to other members in accordance with an application thereof. In a case of using the ultrasonic sensor 10 as an obstacle sensor in the front side of the vehicle 60, it may be attached to the bumper 20 or head lamp cover 21. In a case of using the ultrasonic sensor 10 as an obstacle sensor in the side of the vehicle 60, it may be attached to the cover 22 of the turn signal, the door mirror 23 or the like. In a case of using the ultrasonic sensor 10 as an obstacle sensor in the rear side of the vehicle 60, it may be attached to the cover 24 of the rear lamp, the cover 25 of the back lamp or the like.

(2) Because the oscillation damping member 13 is formed of a material, the degree of elasticity of which is smaller than that of the acoustic matching member 12, the force for restraining the oscillation of the acoustic matching member 12 caused by the ultrasonic wave is small. Therefore, the damping of the ultrasonic oscillation can be made small. This can reduce the damping of the oscillation, making it possible to improve detection sensibility of the ultrasonic wave.

In addition, because the oscillation damping member 13 is formed of a material, the acoustic impedance of which is smaller than that of the acoustic matching member 12, it can be prevented that the ultrasonic wave is the cause of noises by transmission of the ultrasonic wave to the acoustic matching member 12 via a certain object. This can reduce the noise of the ultrasonic wave, making it possible to improve detection sensibility of the ultrasonic wave.

Because a silicone rubber is a material having a low degree of elasticity and low acoustic impedance, it can be suitable in use as the oscillation damping member 13.

(3) By reducing the degree of elasticity and the thickness of the oscillation damping member 13, the force for restraining oscillation of the acoustic matching member 12 can be made small. Therefore, the damping of the ultrasonic oscillation can be made small to improve detection sensitivity.

By making the degree of elasticity of the oscillation damping member 13 equal to or less than 3 MPa as $3/1000$ of degree of elasticity of the acoustic matching member 12, reduction of the detection sensitivity can be made equal to or less than 30%. Further, by making the thickness (contact length) of the oscillation damping member 13 equal to or less than 2 mm as $1/3$ of the thickness T of the acoustic matching member 12, reduction of the detection sensitivity can be made equal to or less than 20%.

Furthermore, by making the degree of elasticity of the oscillation damping member 13 equal to or less than 1 MPa as $1/1000$ of degree of elasticity of the acoustic matching member 12, reduction of the detection sensitivity can be made equal to or less than 10%. Further, by making the thickness (contact length) of the oscillation damping member 13 equal to or less than 2 mm as $1/3$ of the thickness T of the acoustic matching member 12, reduction of the detection sensitivity can be made equal to or less than 5%. That is, the contact length of the oscillation damping member 13, which is in contact with the acoustic matching member 12 over the contact length, can be made small to reduce the force for restraining the oscillation of the acoustic matching member 13. Therefore, the decay of the ultrasonic oscillation can be made small to improve detection sensitivity.

(4) Because the acoustic matching member 12 is formed to generate a standing wave inside the acoustic matching member 12 by the ultrasonic wave received at the receiving surface 12a, cancellation of the ultrasonic wave incident inside the acoustic matching member 12 and the ultrasonic wave reflected on the boundary between the acoustic matching member 12 and the ultrasonic detecting member 11 caused by interference with each other can be reduced. In consequence, the ultrasonic wave can be efficiently transmitted to the ultrasonic detecting element 11.

(5) Because the receiving surface 12a of the acoustic matching member 12 has an area larger than that of the attachment surface 11a of the ultrasonic detecting member 11, the energy of the ultrasonic wave received on the receiving surface 12a is transmitted by the area smaller than that of the receiving surface 12a. In consequence, the energy per unit area increases, thereby enabling an increase of transmission efficiency.

(6) Because the acoustic detecting member 12 is formed of a polycarbonate based resin having a degree of elasticity, a temperature change of which is small, a change of a wavelength of the ultrasonic wave accompanying the temperature change can be made small, making it possible to stably (reliably) generate the standing wave.

In addition, by forming the ultrasonic detecting element 11 using a piezoelectric element composed of lead zirconate titanate (PZT) having a large piezoelectric constant, the ultrasonic wave having a small sound pressure can be received, making it possible to improve sensitivity of the ultrasonic sensor.

(7) In the structure of forming the acoustic matching member 12 to have a width of equal to or less than a half of the wavelength of the ultrasonic wave transmitting in the air, in a case of arranging a plurality of ultrasonic sensors 10 in an array, a distance between the central portions of the acoustic matching members 12 can be made to be equal to one half of the wavelength of the ultrasonic wave transmitting in the air. This arrangement brings about high detection accuracy.

(8) In the structure where the oscillation damping member 13 is formed to cover the receiving surface 12a of the acoustic matching member 12, since the boundary between the acoustic matching member 12 and the oscillation damping member 13 is not exposed to an outside, intrusion of water (moisture) or the like into the ultrasonic sensor 10 can be prevented.

(9) In the structure where the acoustic matching member 12 is formed so that the acoustic impedance increases from the receiving surface 12a toward the attachment surface 12b, a difference in acoustic impedance of each boundary between the air and the acoustic matching member 12 and between the acoustic matching member 12 and the ultrasonic detecting element 11 can be reduced. Therefore, reflection or dissipation of the ultrasonic wave on the boundary can be reduced, making it possible to reduce the damping of the ultrasonic wave.

(10) The coating layer 15 can be provided for coating at least a part of the receiving surface 12a of the acoustic matching member 12 and the oscillation damping member 13.

Because the oscillation damping member 13, the boundary (boundary faces) between the acoustic matching member 12 and the oscillation damping member 13 and the acoustic matching member 12 are coated by providing the coating layer 15, it is prevented that water (moisture) or the like enter into an inside of the ultrasonic sensor 10. In addition, by adjusting the color tone of the coating layer 15 with the color tone of the bumper 20, it can be hard to visualize the existence of the ultrasonic sensor 10 from an outside, thereby improving design.

(11) By reducing the degree of elasticity and the thickness of the coating layer 15, the force for restraining oscillation of the acoustic matching member 12 can be made small. Therefore, the damping of the ultrasonic oscillation can be made small to improve detection sensitivity. It is preferable that the coating layer 15 is formed of a material having a degree of elasticity smaller than that of the acoustic matching member 12 in view of conformity of the acoustic impedance to the acoustic matching member 12. Assuming that the degree of elasticity of the coating layer 15 is set equal to or less than E/10 (100 MPa) and the thickness thereof is set equal to or less than 0.1 mm, the reduction of the detection sensitivity can be made equal to or less than 20%.

(12) That is, the detection accuracy can be improved and the output can be increased by making the resonance frequency of the coating layer 15 equal to that of the acoustic matching member 12.

(13) In a case where the degree of elasticity of the coating layer 15 is equal to or less than that of the oscillation damping member 13, the coating layer 15 is formed to coat the entire surface of the receiving surface 12a of the acoustic matching member 12 and thereby, reduction of the detection sensitivity can be prevented.

Second Embodiment

Figure 10A:
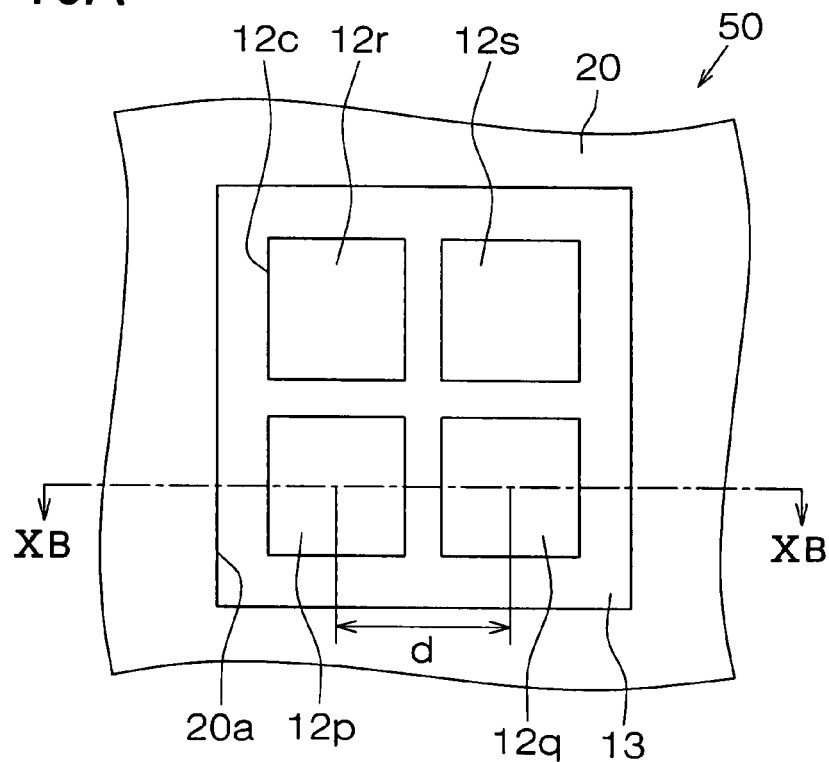
FIG. 10A is a plan explanatory view showing an ultrasonic sensor in a second embodiment of the present invention, viewed from a side of an acoustic matching member.
Figure 10B:
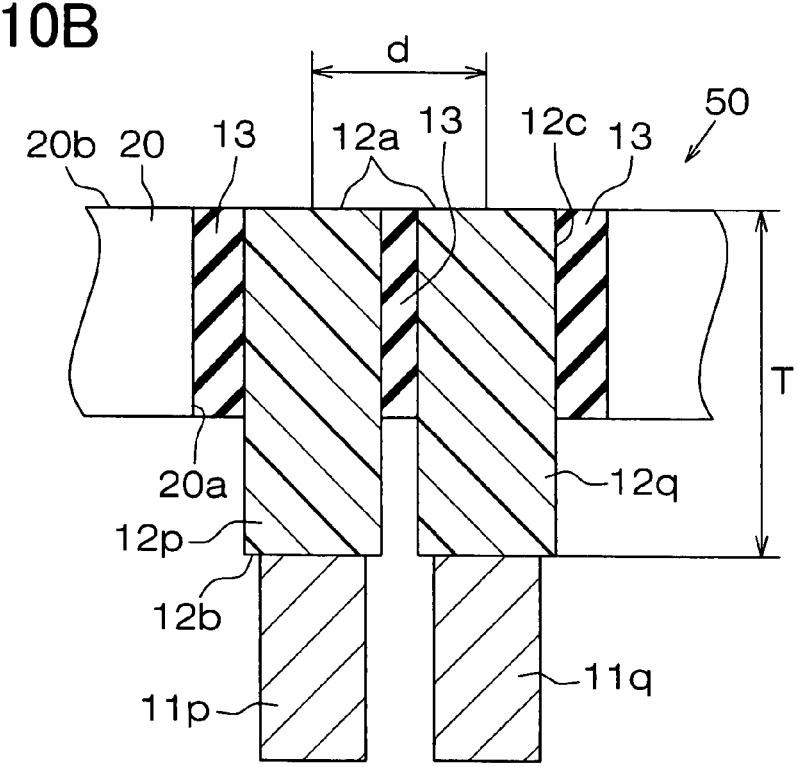
FIG. 10B is a cross section taken along line XB-XB in FIG. 10A.

An ultrasonic sensor in a second embodiment of the present invention will be explained with reference to the accompanying drawings. FIG. 10A is a plan explanatory diagram of an ultrasonic sensor in a second embodiment, viewed from the side of an acoustic matching member. FIG. 10B is a cross section taken along line XB-XB in FIG. 10A and viewed in a direction indicated by an arrow in FIG. 10A. Components similar to those in the first embodiment are referred to as identical numerals and the explanation thereof is omitted.

In an ultrasonic sensor 50 of the present embodiment, a plurality of sets (pairs) of acoustic matching member 12 and ultrasonic detecting element 11 is arranged in an array. In the present embodiment, as shown FIGS. 10A and 10B, two acoustic matching members are arranged in the longitudinal direction and another two in the lateral direction so that totally four acoustic matching members 12 ($12p$ to $12s$) are provided. Also, likewise, four ultrasonic detecting elements 11 ($11p$ and $11q$: ultrasonic detecting elements 11 attached to acoustic matching members $12r$ and $12s$ are not shown) are correspondingly arranged and attached to the four acoustic matching members 12 to make each pair. This structure provides the ultrasonic sensor 50, which is capable of performing three-dimensional detection on a position of a detected body. The oscillation damping member 13 is interposed between each of the acoustic matching members 12 and between each of the acoustic matching members 12 and the attachment portion 20a. In this way, the respective acoustic matching members 12 are attached to the bumper 20.

With this structure, a time difference and a phase difference in the ultrasonic waves received at the respective ultrasonic detecting elements 11 are determined and based upon each difference, not only a distance from the detected body but also a position of the detected body can be measured.

Further, each of the acoustic matching members 12 is formed so that the width W thereof is equal to or less than a half of the wavelength of the ultrasonic wave in the air and is arranged so that a distance d between central portions of the respective adjacent acoustic matching members 12 is equal to or less than a half wavelength of the ultrasonic wave. For example, the distance d corresponds to a length between a central longitudinal axis of the acoustic matching member 12 (e.g., the member $12p$) and a central longitudinal axis of the adjacent acoustic matching member 12 (e.g., the member $12q$).

According to such a structure of each acoustic matching member 12, the time difference can be detected also by the phase difference of the received ultrasonic wave. Therefore, the time difference of the received ultrasonic wave can be accurately detected, making it possible to improve measurement accuracy in a distance and a position of the detected body. Also, because a phase difference in ultrasonic wave between the ultrasonic detecting elements 11 is equal to or less than 180°, an erroneous detection can be limited.

It should be noted that also in a case where the width w is not less than a half of the wavelength of the ultrasonic wave in the air, the ultrasonic sensor 50 can be used for a three-dimensional detection of a position of the detected body.

In a case of receiving the ultrasonic wave at the acoustic matching member $12p$, since the oscillation damping member 13 is interposed between the oscillation matching member $12p$ and the acoustic matching member $12q$, the ultrasonic wave propagating from the oscillation matching member $12p$ to the acoustic matching member $12q$ can be reduced. In consequence, the ultrasonic wave received at the acoustic matching member $12p$ is transmitted to the ultrasonic detecting element $11p$ only and is not transmitted to the other ultrasonic detecting element $11q$.

In this way, the crosstalk characteristic of each ultrasonic detecting element 11 can be improved to accurately determine the time difference and the phase difference of the received ultrasonic wave, improving accuracy of position measurement of the detected body.

A modification of the ultrasonic detecting sensor 10 in the first embodiment can be also applied to the ultrasonic detecting sensor 50 in the second embodiment.

The numbers and the arrangement of the acoustic matching members 12 and the ultrasonic detecting elements 11 can be arbitrarily made in accordance with an application thereof. For example, in a case of two-dimensional detection on the detected body, two sets of the acoustic matching members 12 and the ultrasonic detecting elements 11 should be prepared.

Advantages of the Second Embodiment (1) Because sets of the acoustic matching members 12 and the ultrasonic detecting elements 11 are arranged in an array and the oscillation damping member 13 is interposed between each of the acoustic matching members 12 and between each acoustic matching member 12 and the attachment portion 20a, the ultrasonic wave received at each acoustic matching member 12 is transmitted to the corresponding ultrasonic detecting element 11 only, and is not transmitted to the other ultrasonic detecting member 11. In consequence, the transmission of the ultrasonic wave can be separated and performed for each of the acoustic matching members 12 to improve the crosstalk characteristic of each ultrasonic detecting element 11.

The ultrasonic sensor 50 includes a plurality of sets of acoustic matching members 12 and ultrasonic detecting elements. Therefore, a time difference and a phase difference in the ultrasonic waves received at the respective ultrasonic detecting elements 11 are determined and thereby, based upon each difference, not only a distance from the detected body but also a position of the detected body can be measured. Here, since the ultrasonic wave received at each acoustic matching element 12 is transmitted to the corresponding ultrasonic detecting element 11 only, the time difference and the phase difference in the ultrasonic waves received at the respective ultrasonic detecting elements 11 can be accurately determined to improve accuracy in the position measurement of the detected body.

(2) Each of the acoustic matching members 12 is formed so that the width W thereof is equal to or less than a half of the wavelength of the ultrasonic wave in the air and is arranged so that a distance d between central portions of the respective neighboring acoustic matching members 12 is equal to or less than a half wavelength of the ultrasonic wave. According to such a structure of each acoustic matching member 12, the time difference can be detected also by the phase difference of the received ultrasonic wave. Therefore, the time difference of the received ultrasonic wave can be accurately detected, making it possible to improve measurement accuracy in a distance and a position of the detected body.

Figure 11:
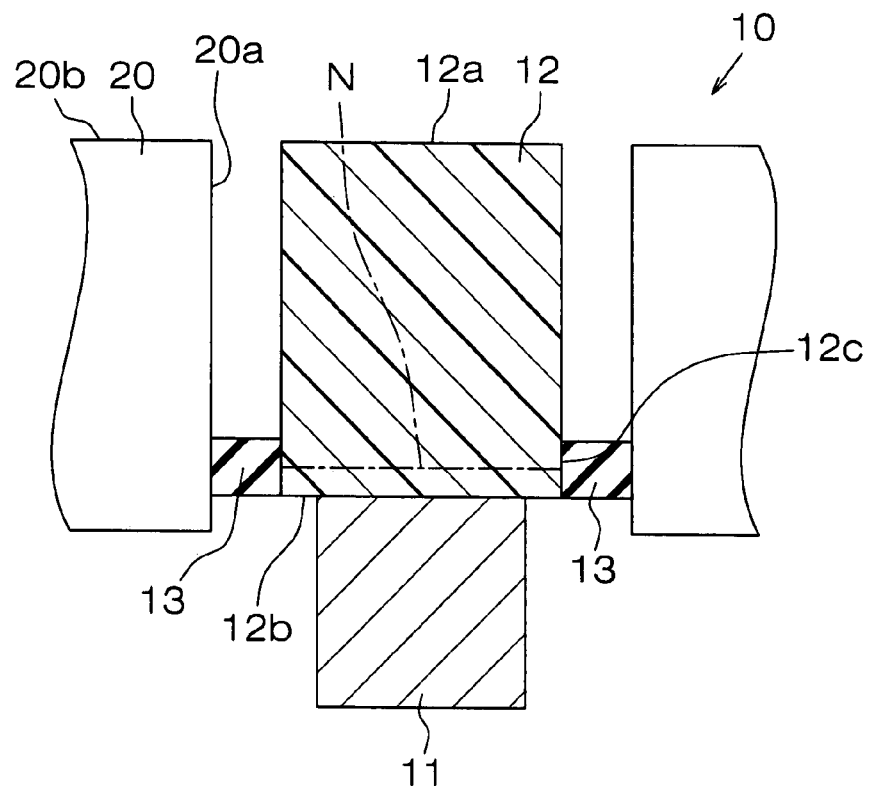
FIG. 11 is an explanatory view showing a modification of a method of holding the acoustic matching member by an oscillation damping member in the second embodiment.

Other Embodiment (1) As shown in FIG. 11, the oscillation damping member 13 may be disposed in the vicinity of oscillation node N (node portion) of a standing wave generated in the vicinity of the attachment surface 12b of the acoustic matching member 12. Here, the position of the node N is defined as a position where an amplitude in the direction between the element and the acoustic matching member 12 and an amplitude in the transmission direction of the ultrasonic wave are minimized based upon simulations, actual measurements of the amplitude or the like.

With this structure, as compared to a case of fixing the oscillation damping member 13 in the vicinity of the receiving surface 12a (FIG. 1), the damping of the oscillation of the acoustic matching member 12 by restraint of the oscillation damping member 13 can be made smaller to improve detection sensitivity of the ultrasonic wave.

Further, a filling material having acoustic impedance smaller than that of the acoustic matching member 12 and the oscillation damping member 13, such as urethane foam or gel, may be filled in a clearance between the acoustic matching member 12 and the oscillation damping member 13. With this structure, it is prevented that foreign matter enters into the clearance to damp the ultrasonic wave, deteriorating sensitivity of the ultrasonic sensor 10. In addition, since the filling material has the acoustic impedance smaller than that of the acoustic matching member 12 or the oscillation damping member 13, the detection sensitivity is limited from being influenced by transmission of the oscillation from the side portion 12c.

Further, the same effect can be achieved by covering an opening of the clearance with a membrane material.

Figure 12:
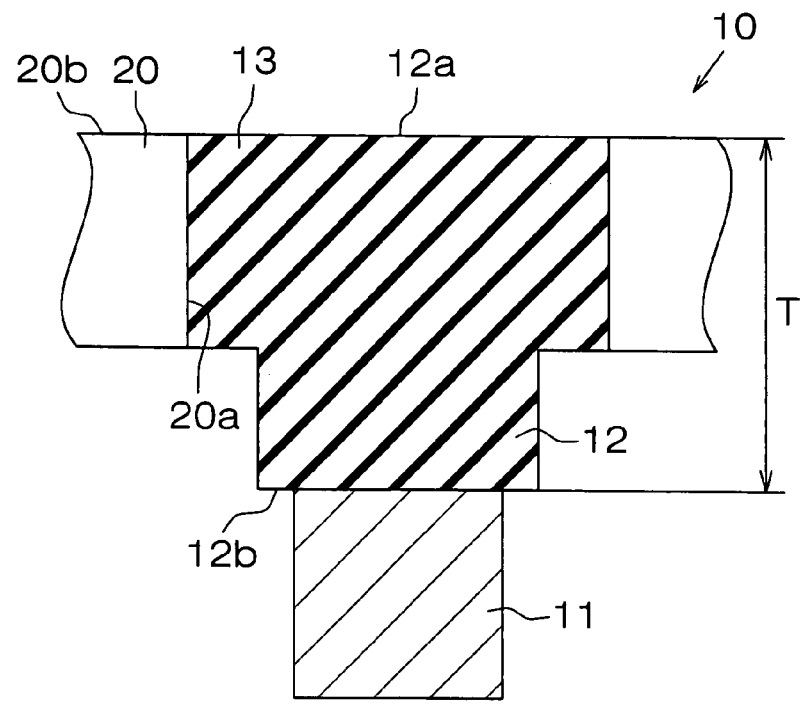
FIG. 12 is an explanatory view showing the acoustic matching member integral with the oscillation damping member.

(2) In a case of forming the acoustic matching member 12 with rubber based material, the acoustic matching member 12 may be, as shown in FIG. 12, formed integral with the oscillation damping member 13. Because the rubber based material has acoustic impedance which is very different from that of the material constituting the vehicle 60, even if the acoustic matching member 12 is formed integral with the oscillation damping member 13, the detection sensitivity is limited from being influenced by transmission of the oscillation from the side portion 12c. With this structure, it is not necessary to separately form the acoustic matching member 12 and the oscillation damping member 13.

(3) A part of the attachment surface 11a of the ultrasonic detecting element 11 may be positioned outside of an outer edge of the attachment surface 12b of the acoustic matching member 12. For example, the attachment surface 11a of the ultrasonic detecting element 11 may be formed to be larger than the attachment surface 12a of the acoustic matching member 12. With this structure, a wire for taking out a signal from the ultrasonic detecting element 11 can be formed at a portion protruded from the attachment surface 12a of the acoustic matching member 12 among the attachment surface 11a of the ultrasonic detecting element 11, facilitating formation of the wire.

Figure 13:
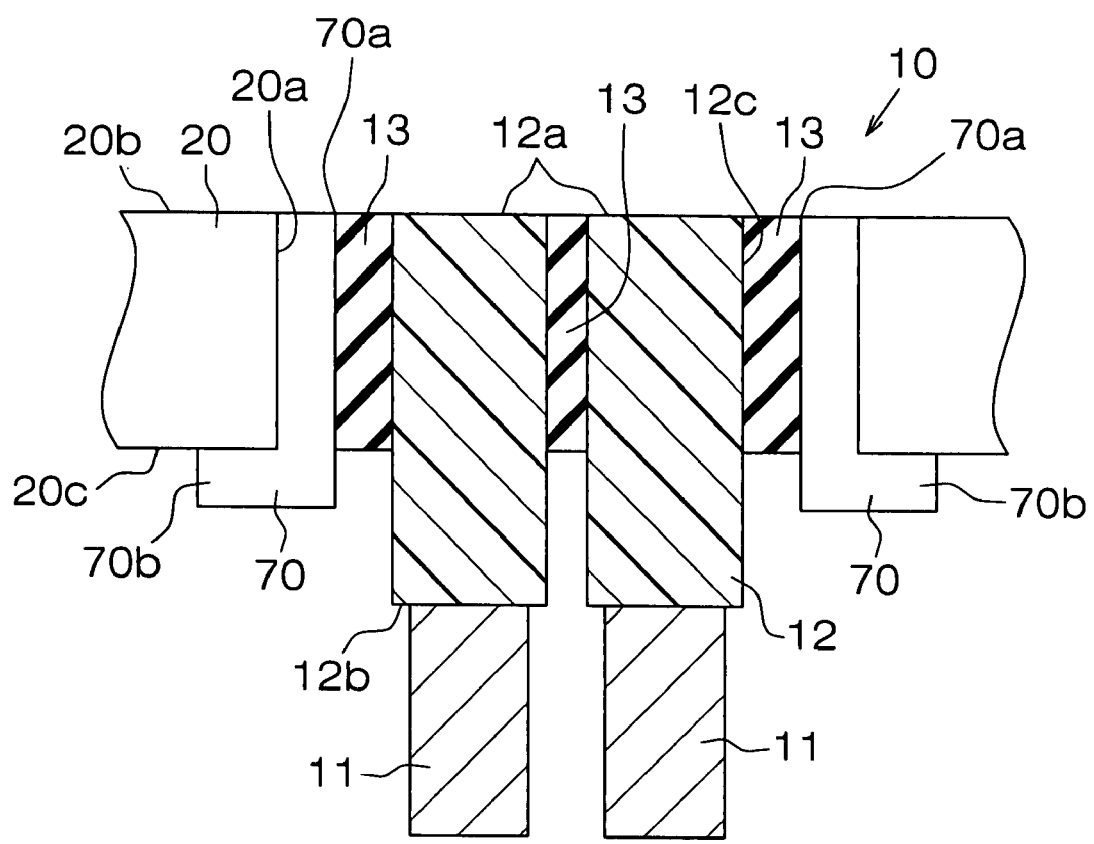
FIG. 13 is an explanatory view showing a modification of a mounting structure of the ultrasonic sensor to a vehicle.

(4) The ultrasonic sensor 10 may be accommodated in a box-shaped case 70 at least one end of which is open in a state where the receiving surface 12a is exposed and this case 70 may be attached to the attachment portion 20a. For example, as shown in FIG. 13, the acoustic matching member 12 is fixed via the oscillation damping member 13 to an opening 70a to receive the ultrasonic sensor 10 in the case 70, and a fixing portion 70b protruding in the horizontal direction in FIG. 13 (e.g., in parallel with the bumper 20) is adhesively fixed on the inner side surface 20c of the bumper 20.

With this structure, simply when the ultrasonic sensor 10 in advance accommodated in the case 70 is fixed to the attachment portion 20a together with the case 70, the ultrasonic sensor 10 can be attached to the bumper 20, making it possible to improve operability of an attachment of the ultrasonic sensor 10.

Here, the fixing position of the case 70 may be the side portion 12c or other locations. In addition, the case 70 may be mechanically connected by a snack fit method or the like.

(5) For rigidly fixing the acoustic matching member 12 and the oscillation damping member 13 so that an adherent, fixing portion between the acoustic matching member 12 and the oscillation damping member 13 is not broken by collision of foreign matter or the like, a projection or a recess portion may be formed in the side portion 12c of the acoustic matching member 12 and a recess portion or a projection may be correspondingly formed in the oscillation damping member 13 for fitting in the projection or the recess portion in the acoustic matching member 12.

Figure 14A:
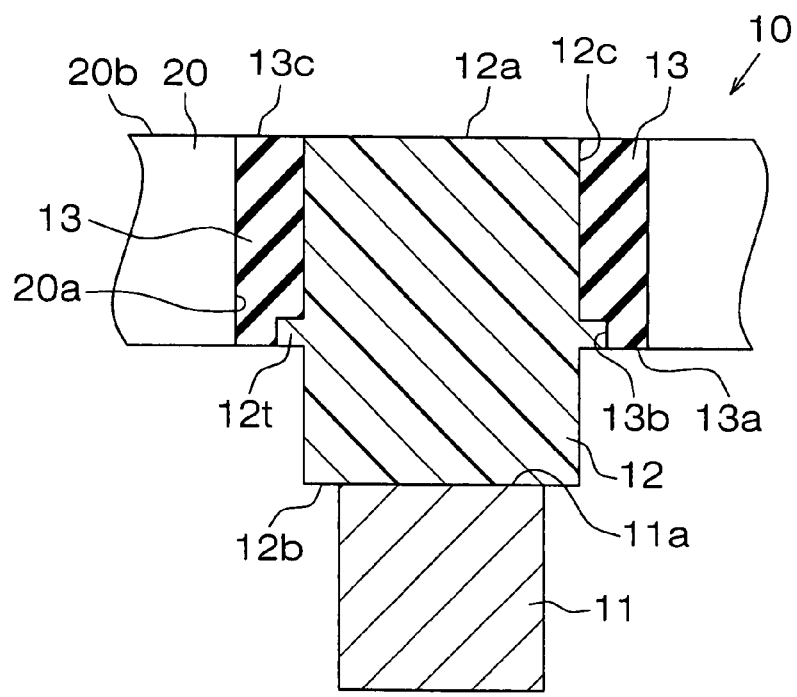
FIGS. 14A, 14B are explanatory views each showing a modification of a bonding structure between the acoustic matching member and the oscillation damping member.

For example, as shown in FIG. 14A, a projection 12t formed projecting in a sheet shape is provided on the entire periphery of the side portion 12c of the acoustic matching member 12 and this projection 12t may be fitted into (engaged with) the recess portion 13b formed in an inner surface 13a of the oscillation damping member 13.

Because an area of adhesion surfaces (engagement surfaces) between the acoustic matching member 12 and the oscillation damping member 13 increases by use of this structure, adhesion between the acoustic matching member 12 and the oscillation damping member 13 can be strengthened. Further, because the adhesion surfaces are formed in a detour shape (e.g., having protrusion and recess), even in a case where the adhesion defect occurs, intrusion of water (moisture) or the like can be prevented.

In addition, because the receiving surface 12a does not change in size, the detection sensitivity to the ultrasonic wave does not deteriorate.

Figure 14B:
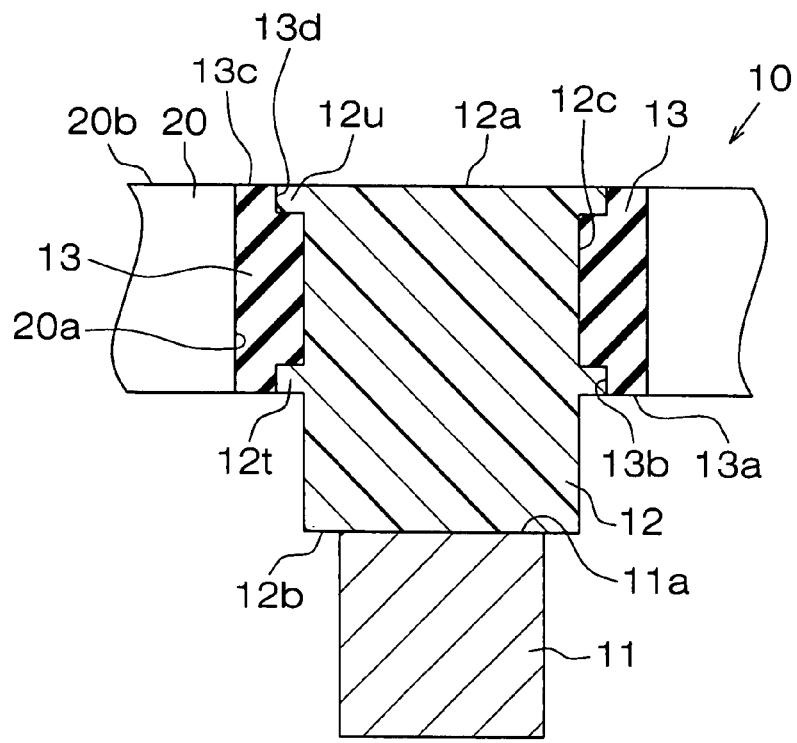

As shown in FIG. 14B, there may be further provided a projection 12u which extends from the receiving surface 12a of the acoustic matching member 12 to the surface direction and is formed in a sheet shape. The projection 12u is fitted into a recess portion 13d formed on an outer surface 13c of the oscillation matching member 13.

Because an adherent area between the acoustic matching member 12 and the oscillation damping member 13 further increases by use of this structure, adhesion between the acoustic matching member 12 and the oscillation damping member 13 can be strengthened.

Further, because the oscillation damping member 13 is provided between the projection 12t and the projection 12u of the acoustic matching member 12, positioning accuracy of the acoustic matching member 12 can be further improved and also even in a case where an adherent is degraded, there is no possibility that the acoustic matching member 12 is shifted out of the oscillation damping member 13.

Figure 15A:
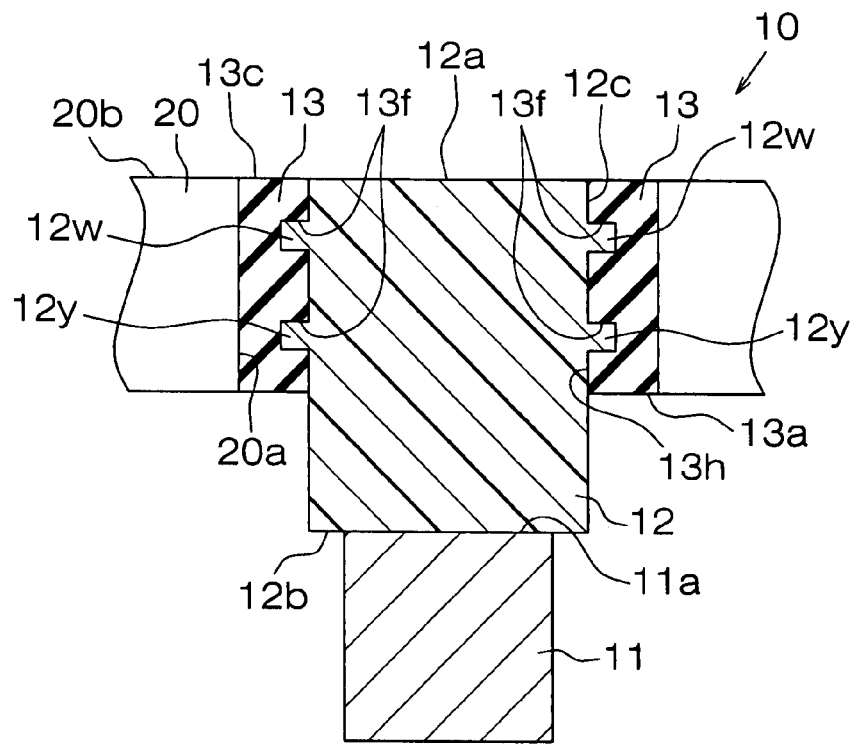
FIGS. 15A, 15B are explanatory views each showing a modification of the bonding structure between the acoustic matching member and the oscillation damping member.

As shown in FIG. 15A, a projection 12w and a projection 12y may be formed on the side portion 12c of the acoustic matching member 12 and recess portions 13f may be formed on an inner side surface 13h of the oscillation damping member 13 for correspondingly engaging with the projections 12w and 12y.

Because entire surface of each of the projections 12w and 12y is cramped by the oscillation damping member 13, the transmission of the oscillation may be more effectively damped. Accordingly, as compared to the projections 12t and 12u, each of the projections 12w and 12y may be made lower in height. In addition, although any number of the projections may be provided, the number of the projections is preferably equal to or less than two to minimize the transmission of the oscillation.

Because an adherent area between the acoustic matching member 12 and the oscillation damping member 13 further increases by use of this structure, adhesion between the acoustic matching member 12 and the oscillation damping member 13 can be strengthened.

In addition, since the receiving surface 12a does not change in size, the detection sensitivity of the ultrasonic wave is not deteriorated.

In each aforementioned structure, the projection portion may be formed in various shapes (e.g., a semispherical, a columnar shape) other than the sheet shape.

In addition, each projection portion may be not required to be formed over the entire periphery of the side portion 12c as long as the projection portion ensures sufficient adhesion strength.

Figure 15B:
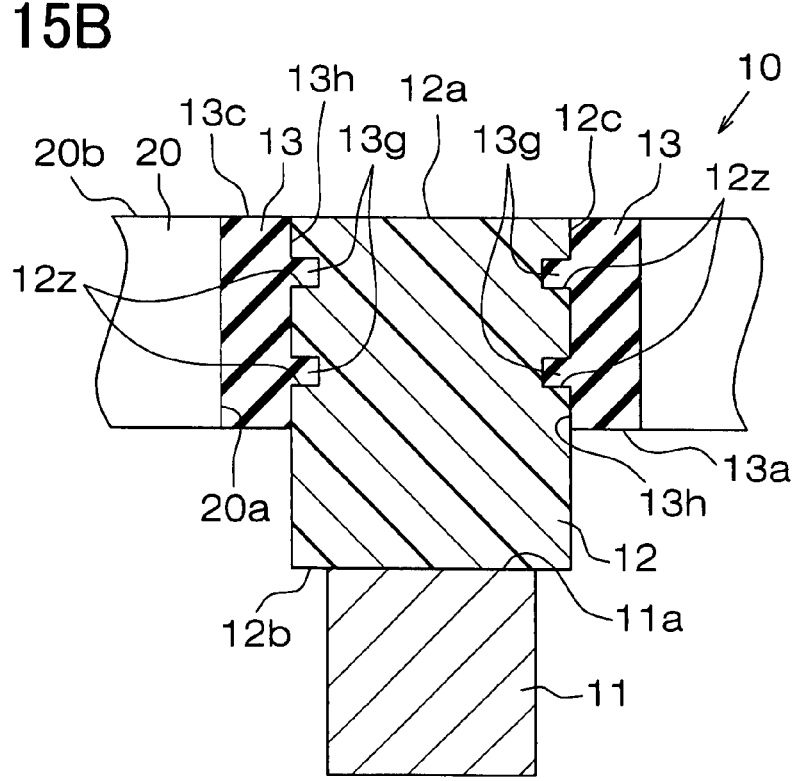

In addition, as shown in FIG. 15B, recess portions 12z may be formed on the side portion 12c of the acoustic matching member 12 and projections 13g for correspondingly fitting into the recess portions 12z may be formed on the inner side surface 13h of the oscillation damping member 13.

In a case of use of this structure also, the same effect as in the structure described in FIG. 15A can be achieved.

Further, a projection portion and a recess portion may be provided together on the side portion 12c of the acoustic matching member 12

For forming a joint body composed of the acoustic matching member 12 and the oscillation damping member 13, the oscillation damping member 13 may be molded integrally with the acoustic matching member 12 by two-color molding, instead of bonding the acoustic matching member 12 and the oscillation damping member 13 by an adhesive.

Here, the molding of the oscillation damping member 13 by two-color molding is performed in such a manner that the acoustic matching member 12 having a predetermined shape is disposed in advance inside a certain mold and that the oscillation damping member 13 is formed integrally by injection molding of a resin material into the certain mold.

In consequence, the acoustic matching member 12 and the oscillation damping member 13 are jointed rigidly. In addition, the adhesion process of the acoustic matching member 12 and the oscillation damping member 13 can be omitted.

As a resin material, there is suitably used a resin material which has high adhesiveness with the acoustic matching member 12 and a small degree of elasticity. An example of such a resin material may include a polyester based thermoplastic elastomer.

Here, the aforementioned structures (FIGS. 14A to 15B) can be likewise applied to the ultrasonic sensor 50 in the second embodiment.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. An ultrasonic sensor attached to a certain object, the sensor comprising:
    an ultrasonic detecting element that detects an ultrasonic wave, which is transmitted by an ultrasonic transmitting element that transmits the ultrasonic wave, and which is reflected by a detected body;
    an acoustic matching member that has a receiving surface that is adapted on a side of the certain object to be exposed to a space, in which the detected body exists, the receiving surface receiving the ultrasonic wave reflected by the detected body, the acoustic matching member transmitting the ultrasonic wave received by the receiving surface to the ultrasonic detecting element, which is attached to an opposing surface of the acoustic matching member opposite the receiving surface, the acoustic matching member being made of a material having an acoustic impedance larger than that of air and smaller than that of the ultrasonic detecting element; and
    an oscillation damping member that is disposed between an attachment portion and the acoustic matching member, the attachment portion being adapted for attaching the ultrasonic sensor to the certain object, the oscillation damping member damping transmission of oscillation from the certain object to the acoustic matching member, wherein
    the acoustic matching member has a contact face that contacts with the oscillation damping member, part of the contact face having one of a projection portion, which projects toward the oscillation damping member, and a recess portion, the oscillation damping member having a corresponding one of a recess portion and a projection portion, the corresponding one of the recess portion and the projection portion of the oscillation damping member having a shape for engaging with the one of the projection portion and the recess portion of the acoustic matching member.

2. The ultrasonic sensor according to claim 1, wherein the oscillation damping member is made of a material having a degree of elasticity smaller than that of the acoustic matching member.

3. The ultrasonic sensor according to claim 2, wherein the degree of elasticity of the oscillation damping member is equal to or less than 1 MPa.

4. The ultrasonic sensor according to claim 3, wherein the oscillation damping member has a contact length of equal to or less than 2 mm in a direction from the receiving surface toward the ultrasonic detecting element, the oscillation damping member being in contact with the acoustic matching member over the contact length.

5. The ultrasonic sensor according to claim 2, wherein the degree of elasticity of the oscillation damping member is equal to or less than 3 MPa.

6. The ultrasonic sensor according to claim 1, wherein the oscillation damping member is made of a material having the acoustic impedance smaller than that of the acoustic matching member.

7. The ultrasonic sensor according to claim 1, wherein the oscillation damping member is made of a silicone rubber.

8. The ultrasonic sensor according to claim 1, wherein the oscillation damping member is provided only at a vicinity of a node portion of a standing wave generated to the acoustic matching member.

9. The ultrasonic sensor according to claim 1, wherein the oscillation damping member is provided to cover the receiving surface of the acoustic matching member.

10. The ultrasonic sensor according to claim 1, wherein the acoustic matching member is fixed to the oscillation damping member by an adhesive material.

11. The ultrasonic sensor according to claim 1, wherein the oscillation damping member is provided integrally with the acoustic matching member by a two-color molding.

12. The ultrasonic sensor according to claim 11, wherein the two-color molding is performed by using an elastomer.

13. The ultrasonic sensor according to claim 1, wherein the acoustic matching member is adapted to generate a standing wave inside thereof due to the ultrasonic wave received by the receiving surface.

14. The ultrasonic sensor according to claim 1, wherein the acoustic matching member is made of a polycarbonate based resin.

15. The ultrasonic sensor according to claim 14, wherein at least the receiving surface of the acoustic matching member is coated with a metallic deposition.

16. The ultrasonic sensor according to claim 1, wherein the acoustic matching member has the acoustic impedance, which increases in a direction from the receiving surface toward the opposing surface.

17. The ultrasonic sensor according to claim 16, wherein:
the acoustic matching member is made of a resin material and of a filler, which is added to the resin material; and
an additional amount of the tiller added to the resin material increases in the direction from the receiving surface toward the opposing surface.

18. The ultrasonic sensor according to claim 16, wherein the acoustic matching member is formed by laminating a plurality of resin based materials, each of which has a different acoustic impedance from each other, the plurality of resin based materials being laminated onto one another in an ascending order of the acoustic impedance in the direction from the receiving surface toward the opposing surface.

19. The ultrasonic sensor according to claim 1, wherein the acoustic matching member has a distance between opposing side edges of the receiving surface, the distance being equal to or less than a half of the wavelength of the ultrasonic wave transmitting in air.

20. The ultrasonic sensor according to claim 1, wherein the acoustic matching member is provided integrally with the oscillation damping member by a rubber based material.

21. The ultrasonic sensor according to claim 1, wherein the receiving surface has an area larger than an area of a surface of the ultrasonic detecting element, the surface of the ultrasonic detecting element being in contact with the opposing surface.

22. The ultrasonic sensor according to claim 1, wherein the ultrasonic detecting element has a surface, through which the ultrasonic detecting element is attached to the opposing surface, part of the surface of the ultrasonic detecting element being provided outside an outer edge of the opposing surface.

23. The ultrasonic sensor according to claim 1, wherein the ultrasonic detecting element is made of a lead zirconate titanate based material.

24. The ultrasonic sensor according to claim 1, further comprising a coating layer that covers at least a part of the receiving surface and covers a surface of the oscillation damping member, the surface of the oscillation damping member being exposed to the space, in which the detected body exists.

25. The ultrasonic sensor according to claim 24, wherein the coating layer is made of a material having a degree of elasticity smaller than that of the acoustic matching member.

26. The ultrasonic sensor according to claim 24, wherein:
the coating layer has the degree of elasticity equal to or less than $1/10$ of the degree of elasticity of the acoustic matching member; and
the coating layer has a thickness equal to or less than 0.1 mm.

27. The ultrasonic sensor according to claim 24, wherein the coating layer is adapted to have a resonance frequency substantially equal to that of the acoustic matching member.

28. The ultrasonic sensor according to claim 24, wherein:
the coating layer has a degree of elasticity equal to or less than a degree of elasticity of the oscillation damping member; and
the coating layer covers an entire surface of the acoustic matching member.

29. The ultrasonic sensor according to claim 1, wherein the certain object is a vehicle.

30. The ultrasonic sensor according to claim 29, wherein the attachment portion is provided to one of a head lamp cover, a rear lamp cover, a turn signal cover, a back lamp cover, a door mirror, and a bumper of the vehicle.

31. An ultrasonic sensor attached to a certain object, the sensor comprising:
an ultrasonic detecting element that detects an ultrasonic wave, which is transmitted by an ultrasonic transmitting element that transmits the ultrasonic wave, and which is reflected by a detected body;
an acoustic matching member that has a receiving surface that is adapted on a side of the certain object to be exposed to a space, in which the detected body exists, the receiving surface receiving the ultrasonic wave reflected by the detected body, the acoustic matching member transmitting the ultrasonic wave received by the receiving surface to the ultrasonic detecting element, which is attached to an opposing surface of the acoustic matching member opposite the receiving surface, the acoustic matching member being made of a material having an acoustic impedance larger than that of air and smaller than that of the ultrasonic detecting element; and
an oscillation damping member that is disposed between an attachment portion and the acoustic matching member, the attachment portion being adapted for attaching the ultrasonic sensor to the certain object, the oscillation damping member damping transmission of oscillation from the certain object to the acoustic matching member, wherein
the acoustic matching member is one of a plurality of acoustic matching members;
the ultrasonic detecting element is one of a plurality of ultrasonic detecting elements for making a pair with a corresponding one of the plurality of acoustic matching members;

a plurality of pairs of the acoustic matching member and the ultrasonic detecting element is arranged in an array; and the oscillation damping member is adapted between each of the acoustic matching members and is also adapted between each of the acoustic matching members and the attachment portion.

32. The ultrasonic sensor according to claim 31, wherein the acoustic matching members are arranged such that a distance between a center portion of one of the acoustic matching members and a center portion of a corresponding one of the acoustic matching members is equal to or substantially equal to a half of a wavelength of the ultrasonic wave transmitting in air.

* * * * *